US012330064B2

(12) United States Patent
Watanabe

(10) Patent No.: US 12,330,064 B2
(45) Date of Patent: Jun. 17, 2025

(54) INFORMATION PROCESSING SYSTEM, INFORMATION PROCESSING METHOD AND INFORMATION PROCESSING PROGRAM

(71) Applicant: GREE, INC., Tokyo (JP)

(72) Inventor: Masashi Watanabe, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 18/601,152

(22) Filed: Mar. 11, 2024

(65) Prior Publication Data

US 2024/0216812 A1 Jul. 4, 2024

Related U.S. Application Data

(63) Continuation of application No. 17/851,778, filed on Jun. 28, 2022, now Pat. No. 11,998,845.

(30) Foreign Application Priority Data

Jun. 28, 2021 (JP) ................................ 2021-106217

(51) Int. Cl.
*A63F 13/56* (2014.01)
*A63F 13/5255* (2014.01)
(Continued)

(52) U.S. Cl.
CPC .......... *A63F 13/56* (2014.09); *A63F 13/5255* (2014.09); *A63F 13/5258* (2014.09);
(Continued)

(58) Field of Classification Search
CPC ...... A63F 13/422; A63F 13/426; A63F 13/45; A63F 13/50; A63F 13/5258; A63F 13/5255; A63F 13/55; A63F 13/56; A63F 13/69
See application file for complete search history.

(56) References Cited

U.S. PATENT DOCUMENTS 6,853,935 B2 2/2005 Satoh et al.
10,453,248 B2 10/2019 Sawaki
(Continued)

FOREIGN PATENT DOCUMENTS

JP 2007-188310 A 7/2007
JP 2017-028390 A 2/2017
(Continued)

OTHER PUBLICATIONS

Mar. 12, 2024 Office Action issued in Japanese Patent Application No. 2021-207664.
(Continued)

*Primary Examiner* — Omkar A Deodhar
(74) *Attorney, Agent, or Firm* — Oliff PLC

(57) ABSTRACT

An information processing system is disclosed that includes a drawing portion that draws a display image for a terminal including at least one display medium positioned in a virtual space, an acquisition portion that acquires input from a user, and a position update portion that changes a position of the display medium associated with one user in the virtual space based on a first input from the one user acquired by the acquisition portion. The drawing portion draws guidance information indicating a positional relationship between a first display medium associate with the one user and a second display medium associated with another user, associating the guidance information with the first display medium.

11 Claims, 24 Drawing Sheets

(51) Int. Cl.
*A63F 13/5258* (2014.01)
*A63F 13/69* (2014.01)

(52) U.S. Cl.
CPC ...... *A63F 13/69* (2014.09); *A63F 2300/5553* (2013.01); *A63F 2300/8082* (2013.01)

(56) References Cited

U.S. PATENT DOCUMENTS

| | | | |
|---|---|---|---|
| 10,838,206 B2 | 11/2020 | Fortin-Deschênes et al. | |
| 2010/0285873 A1 | 11/2010 | Tawara et al. | |
| 2012/0308078 A1 | 12/2012 | Fujibayashi et al. | |
| 2018/0101990 A1 | 4/2018 | Yang et al. | |
| 2018/0178126 A1* | 6/2018 | Takahashi | A63F 13/95 |
| 2018/0264363 A1* | 9/2018 | Moberg | A63F 13/211 |
| 2018/0329603 A1 | 11/2018 | Sawaki | |
| 2018/0330536 A1 | 11/2018 | Sawaki | |
| 2018/0373328 A1 | 12/2018 | Sawaki | |
| 2019/0130599 A1 | 5/2019 | Gebbie et al. | |
| 2019/0333261 A1 | 10/2019 | Nakashima | |
| 2021/0248803 A1 | 8/2021 | Kojima et al. | |
| 2022/0080316 A1* | 3/2022 | Huang | A63F 13/5378 |
| 2023/0219003 A1 | 7/2023 | Hotta | |

FOREIGN PATENT DOCUMENTS

| | | |
|---|---|---|
| JP | 2018-73172 A | 5/2018 |
| JP | 2018-109835 A | 7/2018 |
| JP | 2018-190336 A | 11/2018 |
| WO | 2020/090786 A1 | 5/2020 |

OTHER PUBLICATIONS

Dec. 5, 2023 Office Action issued in Japanese Patent Application No. 2021-209081.

Jul. 26, 2022 Office Action issued in Japanese Patent Application No. 2021-188351.

Feb. 21, 2023 Office Action issued in Japanese Patent Application No. 2021-106217.

Nov. 15, 2022 Office Action issued in Japanese Patent Application No. 2021-188351.

Apr. 9, 2024 Office Action issued in Japanese Patent Application No. 2021-209081.

Jul. 29, 2024 Office Action issued in U.S. Appl. No. 17/990,414.

Dec. 19, 2024 Office Action issued in U.S. Appl. No. 17/990,414.

Apr. 9, 2025 Notice of Allowance issued in U.S. Appl. No. 17/990,414.

Apr. 15, 2025 Office Action issued in Japanese Patent Application No. 2024-146042.

* cited by examiner

600

| USER ID | USER NAME | USER AUTHENTICATION INFORMATION | USER AVATAR ID | POSITION/ORIENTATION INFORMATION | FRIEND INFORMATION | • • • |
|---|---|---|---|---|---|---|
| U01 | USER A | * * * | * * * | * * * | * * * | • • • |
| U02 | USER B | * * * | * * * | * * * | * * * | • • • |
| • • • | • • • | • • • | • • • | • • • | • • • | • • • |

| AVATAR ID | FACE PART ID | HAIRSTYLE PART ID | CLOTHING PART ID | • • • |
|---|---|---|---|---|
| A01 | * * * | * * * | * * * | • • • |
| A02 | * * * | * * * | * * * | • • • |
| • • • | • • • | • • • | • • • | • • • |

| CONTENT ID | PROVISION POSITION | CONTENT | CONTENT PROVISION CONDITION | • • • |
|---|---|---|---|---|
| CT01 | * * * | * * * | * * * | • • • |
| CT02 | * * * | * * * | * * * | • • • |
| • • • | • • • | • • • | • • • | • • • |

| TICKET ID | CONTENT PROVISION POSITION | OWNER ID | PURCHASE INFORMATION | AUTHENTICATION INFORMATION FOR TRANSFER | TRANSFER INFORMATION | VALIDITY FLAG | • • • |
|---|---|---|---|---|---|---|---|
| TC01 | * * * | U01 | * * * | * * * | * * * | 1 | • • • |
| TC02 | * * * | U01 | * * * | * * * | * * * | 1 | • • • |
| TC03 | * * * | U08 | * * * | * * * | — | 0 | • • • |
| • • • | • • • | • • • | • • • | • • • | • • • | • • • | • • • |

FIG. 9

| GROUP ID | GROUP NAME | USER ID |
|---|---|---|
| *** | *** | ***<br>***<br>***<br>... |
| *** | *** | *** |
| ... | ... | ... |

INFORMATION PROCESSING SYSTEM, INFORMATION PROCESSING METHOD AND INFORMATION PROCESSING PROGRAM

This application is a continuation of U.S. application Ser. No. 17/851,778 filed Jun. 28, 2022, which claims the benefit of priority from Japanese Patent Application No. 2021-106217 filed Jun. 28, 2021, the entire contents of the prior applications being incorporated herein by reference.

TECHNICAL FIELD

This disclosure relates to an information processing system, an information processing method, and an information processing program.

BACKGROUND ART

There is a known technology in which a plurality of types of spaces such as a room and an ice country are set in a virtual space, and a door for entering a specific space is placed in the space where an avatar is located.

SUMMARY

Problem to be Resolved

When the virtual space is designed as a space having an expanse imitating reality, the movement distance of each avatar to reach a desired space tends to be relatively long. In such a case, it is useful to be able to appropriately assist the user so that the operation of moving the user's avatar to a desired position can easily be performed.

Therefore, in one aspect, an objective of this disclosure is to appropriately assist the movement of a display medium such as an avatar in a virtual space.

Means of Solving Problem

In one aspect, an information processing system is provided that includes:

- a drawing portion that draws a display image for a terminal including at least one display medium positioned in a virtual space;
- an acquisition portion that acquires input from a user; and
- a position update portion that changes a position of the display medium associated with one user in the virtual space based on a first input from the one user acquired by the acquisition portion;
- wherein the drawing portion draws guidance information indicating a positional relationship between a first display medium associated with the one user and a second display medium associated with another user, associating the guidance information with the first display medium.

Effect

In one aspect, this disclosure makes it possible to appropriately assist the movement of a display medium such as an avatar in a virtual space.

BRIEF EXPLANATION OF DRAWINGS

FIG. 6 is an explanatory view of data in a user database.

FIG. 7 is an explanatory view of data in an avatar database.

FIG. 8 is an explanatory view of data in a content information memory.

FIG. 9 is an explanatory view of data in a ticket information memory.

MODE TO IMPLEMENT DISCLOSURE

Below, an embodiment for implementing the disclosure will be described with reference to the drawings.

(Overview of Virtual Reality Generation System)

Figure 1:
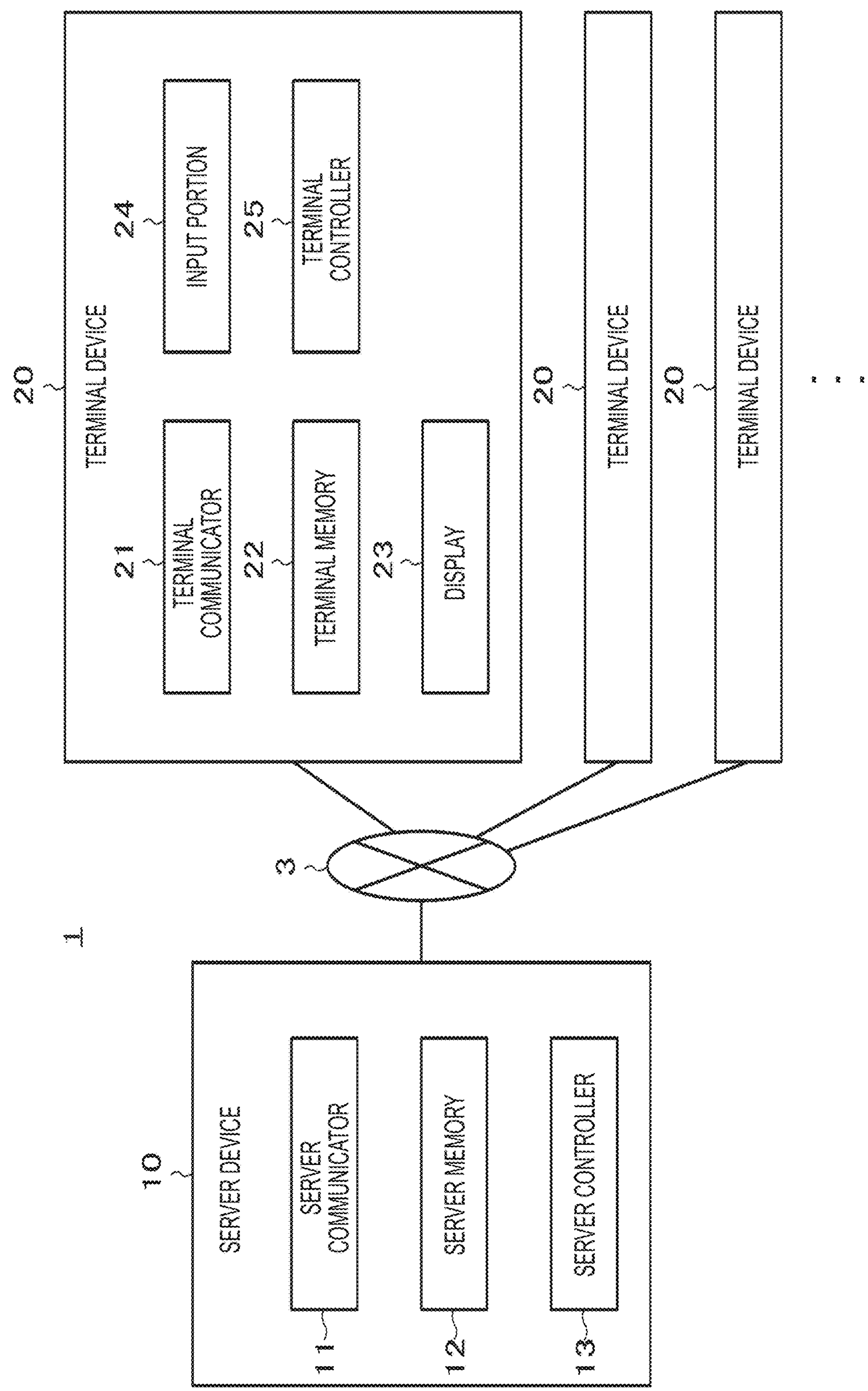
FIG. 1 is a block diagram of a virtual reality generation system according to this embodiment.

An overview of a virtual reality generation system 1 according to an embodiment of this disclosure will be described with reference to FIG. 1. FIG. 1 is a block diagram of the virtual reality generation system 1 according to this embodiment. The virtual reality generation system 1 comprises a server device 10 and one or more terminal devices 20. For simplicity, FIG. 1 shows three terminal devices 20, but the number of terminal devices 20 may be two or more.

The server device 10 is, for example, a server managed by an administrator who provides one or more virtual realities. Each terminal device 20 is a device used by a user, such as a mobile phone, a smartphone, a tablet terminal, a PC (personal computer), a head-mounted display, or a game device or the like. A plurality of terminal devices 20 may be connected to the server device 10 via a network 3 in a manner typically different for each user.

Each terminal device 20 can execute a virtual reality application according to this embodiment. The virtual reality application may be received by the terminal devices 20 from the server device 10 or a predetermined application distribution server via the network 3, or may be stored in advance on a storage device provided in each terminal device 20 or on a storage medium such as a memory card or the like readable by the terminal device 20. The server device 10 and the terminal devices 20 are communicably connected via the network 3. For example, the server device 10 and the terminal devices 20 cooperate to execute various processes related to the virtual reality.

The network 3 may include a wireless communication network, the Internet, a VPN (Virtual Private Network), a WAN (Wide Area Network), a wired network, or any combination thereof.

Here, an overview of a virtual reality according to this embodiment will be described. The virtual reality according to this embodiment is, for example, a virtual reality for any reality such as education, travel, role playing, simulation, entertainment such as a game or a concert, or the like, and a virtual reality medium such as an avatar is used accompanying execution of the virtual reality. For example, the virtual reality according to this embodiment is realized by a three-dimensional virtual space, various virtual reality media appearing in the virtual space, and various content provided in the virtual space.

A virtual reality medium is electronic data used in virtual reality, and for example includes any medium such as cards, items, points, in-service currency (or a virtual reality currency), tokens (for example, Non-Fungible Tokens (NFTs)), tickets, characters, avatars, parameters, or the like. In addition, the virtual reality medium may be virtual-reality-related information such as level information, status information, virtual reality parameter information (physical strength value and attack power, or the like) or ability information (skills, abilities, spells, jobs, or the like). In addition, the virtual reality medium is electronic data that can be acquired, owned, used, managed, exchanged, synthesized, enhanced, sold, discarded, or gifted by the user in the virtual reality, but uses of the virtual reality medium are not limited to those specified in this specification.

(Configuration of Server Device)

The configuration of the server device 10 will be specifically described. The server device 10 is constituted by a server computer. The server device 10 may be realized by cooperation among a plurality of server computers. For example, the server device 10 may be realized by cooperation among a server computer that provides various content, a server computer that realizes various authentication servers, and the like. Further, the server device 10 may include a web server. In this case, a portion of the functions of the terminal device 20 described below may be realized by a browser processing HTML documents received from the web server and various programs (Javascript) associated therewith.

The server device 10 comprises a server communicator 11, a server memory 12 and a server controller 13.

The server communicator 11 includes an interface that communicates with an external device wirelessly or by wire and sends and receives information. The server communicator 11 may include, for example, a wireless LAN (Local Area Network) communications module, a wired LAN communications module, or the like. The server communicator 11 can send information to and receive information from the terminal devices 20 via the network 3.

The server memory 12 is, for example, a memory device and stores various information and programs necessary for various processes related to virtual reality. For example, the server memory 12 stores a virtual reality application.

Further, the server memory 12 stores data for drawing a virtual space, for example, an image of an indoor space such as a building, or of an outdoor space, or the like. The data for drawing virtual spaces may be prepared in a plurality of types, and may be used differently, for each virtual space.

Further, the server memory 12 stores various images (texture images) for projection (texture mapping) on various objects arranged in the three-dimensional virtual space.

For example, the server memory 12 stores drawing information of a user avatar M1 (an example of a display medium) as a virtual reality medium associated with each user. The user is a user of the virtual reality generation system 1. The user may include, in addition to a general user, a staff user who manipulates an avatar in connection with an administrator of the virtual reality generation system 1, a guest user who provides content in the virtual space, and the like. The user avatar M1 is drawn in the virtual space based on the drawing information of the user avatar M1.

Further, the server memory 12 stores drawing information related to various objects different from the user avatar M1, such as buildings, walls, trees, or NPCs (Non Player Characters) and the like. Various objects are drawn in the virtual space based on such drawing information.

Hereinafter, objects corresponding to an arbitrary virtual reality medium (for example, a building, a wall, a tree, an NPC, or the like) different from the user avatar M1 and drawn in the virtual space is also referred to as second objects M3. In this embodiment, the second objects M3 may include objects fixed in the virtual space, objects movable in the virtual space, and the like. Further, the second objects M3 may include objects that are always placed in the virtual space, objects that are placed only when a predetermined placement condition is satisfied, and the like.

The server controller 13 may include a dedicated microprocessor, a CPU (Central Processing Unit) that realizes a specific function by reading a specific program, a GPU (Graphics Processing Unit), and the like. For example, the server controller 13 cooperates with a terminal device 20 to execute a virtual reality application in response to a user operation of a display 23 of the terminal device 20. In addition, the server controller 13 executes various processes related to virtual reality. Details of specific processing by the server controller 13 are described below.

(Configuration of Terminal Device)

The configuration of a terminal device 20 will be described. As shown in FIG. 1, the terminal device 20 comprises a terminal communicator 21, a terminal memory 22, a display 23, an input portion 24, and a terminal controller 25.

The terminal communicator 21 includes an interface that communicates with an external device wirelessly or by wire and sends and receives information. The terminal communicator 21 may include a wireless communication module compatible with mobile communication standards such as LTE (Long Term Evolution) (registered trademark), LTE-A (LTE-Advanced), fifth-generation mobile communications system, and UMB (Ultra Mobile Broadband) and the like, a wireless LAN communications module, a wired LAN communications module, and the like. The terminal communicator 21 can send information to and receive information from the server device 10 via the network 3.

The terminal memory 22 includes, for example, a primary memory device and a secondary memory device. For example, the terminal memory 22 may include semiconductor memory, magnetic memory, optical memory, or the like. The terminal memory 22 stores various information and programs received from the server device 10 and used for virtual reality processing. Information and programs used for virtual reality processing may be acquired from an external device via the terminal communicator 21. For example, the virtual reality application program may be acquired from a predetermined application distribution server. Hereinafter, the application program is also simply referred to as an application. Further, for example, all or a part of the above-described information about the user and information about the virtual reality medium of another user may be acquired from the server device 10.

The display 23 includes a display device such as a liquid crystal display or an organic EL (Electro-Luminescence) display. The display 23 can display various images. The display 23 comprises, for example, a touch panel, and functions as an interface for detecting various user operations. The display 23 may be in the form of a head-mounted display.

The input portion 24 includes, for example, an input interface including a touch panel provided integrally with the display 23. The input portion 24 can accept user input to the terminal device 20. Further, the input portion 24 may include a physical key, or may further include an arbitrary input interface such as a pointing device such as a mouse or the like. Further, the input portion 24 may be able to accept non-contact type user input such as voice input or gesture input. A sensor (image sensor, acceleration sensor, distance sensor, or the like) for detecting movement of the user's body may be used for the gesture input.

The terminal controller 25 includes one or more processors. The terminal controller 25 controls operation of the entire terminal device 20.

The terminal controller 25 transmits and receives information via the terminal communicator 21. For example, the terminal controller 25 receives various information and programs used for various processes related to virtual reality from at least one of the server device 10 and another external server. The terminal controller 25 stores the received information and programs in the terminal memory 22. For example, the terminal memory 22 may store a browser (Internet browser) for connecting to a web server.

The terminal controller 25 starts a virtual reality application in response to a user operation. The terminal controller 25 cooperates with the server device 10 to execute various processes related to virtual reality. For example, the terminal controller 25 causes the display 23 to display an image of the virtual space. For example, a GUI (Graphic User Interface) for detecting a user operation may be displayed on the screen. The terminal controller 25 can detect a user operation on the screen via the input portion 24. For example, the terminal controller 25 can detect a user's tap operation, long tap operation, flick operation, swipe operation, and the like. A tap operation is an operation in which the user touches the display 23 with a finger and then releases the finger. The terminal controller 25 transmits the operation information to the server device 10.

(Example of Virtual Space)

The server controller 13 cooperates with the terminal device 20 to display an image of the virtual space on the display 23, and updates the image of the virtual space according to the progress of the virtual reality and user operation. In this embodiment, the server controller 13 cooperates with the terminal device 20 to draw an object arranged in a three-dimensional virtual space as viewed from a virtual camera arranged in the virtual space.

The drawing process described below is realized by the server controller 13, but in another embodiment, all or a part of the drawing process described below may be realized by the server controller 13. In the following description, at least a part of the image of the virtual space displayed on the terminal device 20 is set as a web display to be displayed on the terminal device 20 based on the data generated by the server device 10, and at least a part of the image may be a native display displayed by a native application installed in the terminal device 20.

Figure 2:
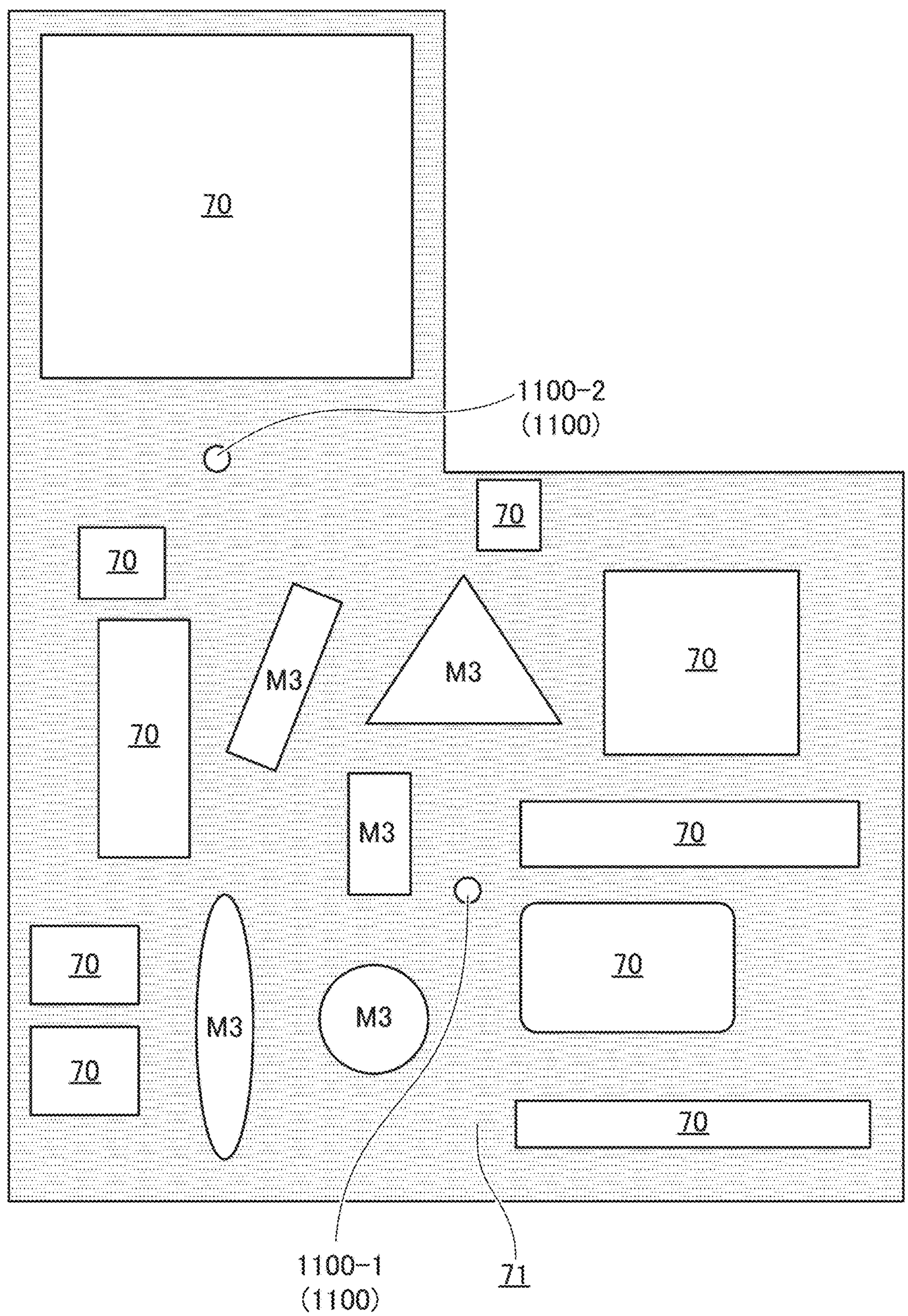
FIG. 2 is an explanatory view of an example of a virtual space that can be generated by the virtual reality generation system.

FIG. 2 is an explanatory view of an example of a virtual space that can be generated by the virtual reality generation system 1.

In this embodiment, the virtual space may include a plurality of space portions. Each of the plurality of space portions is a space portion into which the user avatar M1 may enter, and each may be able to provide its own content. Each of the plurality of space portions may be generated in a manner of forming a space continuous with each other in the virtual space, as in the case of various spaces in the real world. Alternatively, some or all of the plurality of space portions may be discontinuous with each other. Discontinuity is a relationship that is connected in a manner contrary to the laws of physics in reality, and is a relationship among space portions capable of movement in a mode of instantaneous movement such as warp.

In the example shown in FIG. 2, the virtual space includes a plurality of space portions 70 for providing content, and a free space portion 71. In the free space portion 71, the user avatar M1 can basically move freely. Content (for example, various content described below as provided by the space portion 70) may also be provided in the free space portion 71 as appropriate.

The space portions 70 may be a space portion that are at least partially separated from the free space portion 71 by a wall body (an example of the second object M3) or a movement prohibiting portion (an example of the second object M3). For example, each space portion 70 may have an entrance and/or exit (for example, a second object M3 such as a hole or a door) through which a user avatar M1 can enter and exit the free space portion 71. In each space portion 70, the content may be provided to a user avatar M1 located in the space portion 70.

The types and numbers of content (content provided in virtual reality) provided by the space portions 70 are arbitrary. In this embodiment, as an example, the content provided by the space portions 70 includes digital content such as various images. The video images may be real-time video or non-real-time video. Further, the video images may be video images based on actual images or video images based on CG (Computer Graphics). The video images may be video images for providing information. In this case, the video images may be related to information provision services of a specific genre (information provision services related to travel, housing, food, fashion, health, beauty, or the like), broadcast services by specific users (for example, Youtube (registered trademark)), or the like.

The content provided by the space portions 70 may be various items (examples of the second object M3) that can be used in the virtual space. In this case, a space portion 70 that provides various items may be in the form of a sales office. Alternatively, the content provided by a space portion 70 may be acquisition authority or a token of an article that is actually available. A portion of the plurality of space portions 70 may be space portions that do not provide content.

Each of the space portions 70 may be operated by a different entity as in an actual store. In this case, the administrator of each space portion 70 may use the corresponding space portion 70 by paying a store opening fee or the like to the administrator of the virtual reality generation system 1.

The virtual space may be expandable as the space portions 70 increase. Alternatively, a plurality of virtual spaces may be set for each attribute of the content provided by the space portion 70. In this case, the virtual spaces may be discontinuous or continuous with each other as "space portions".

(Drawing Function in Virtual Space)

The server controller 13 cooperates with the terminal device 20 to display a display image for a terminal (hereinafter, also simply referred to as a "terminal image") on the display 23, and updates the terminal image. In a modified example, the terminal image may be drawn by the terminal device 20 (see FIG. 24 and the like).

Figure 3:
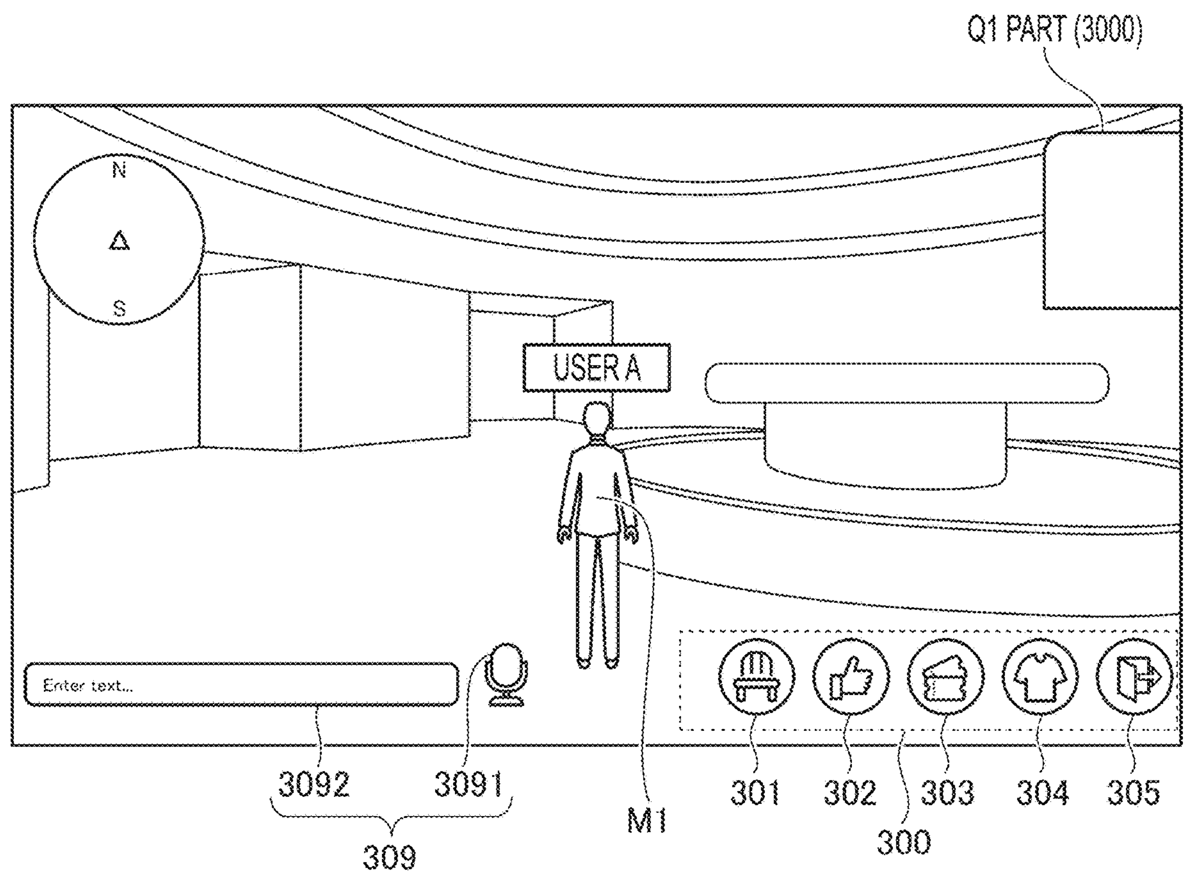
FIG. 3 is a drawing showing an example of a terminal image.

FIG. 3 is an explanatory view of a terminal image, and is a diagram showing an example of a terminal image. In FIG. 3, a part of the virtual space is drawn together with the user avatar M1 (user name "User A"). The terminal image may be drawn as an image from a virtual camera 60 arranged in the virtual space. In this case, the virtual camera 60 may be set for each user avatar M1. Further, the virtual camera 60 may include a camera installed at a fixed point in addition to the camera for each user avatar M1.

Figure 4:
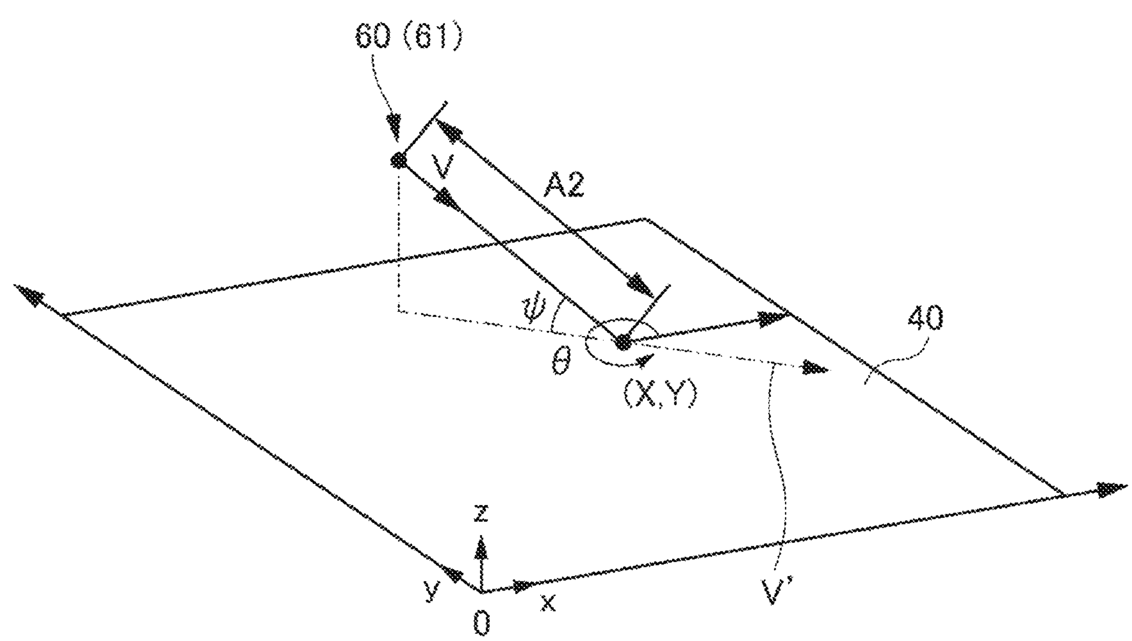
FIG. 4 is an explanatory view of camera parameters of a virtual camera.

FIG. 4 is an explanatory view of camera parameters of the virtual camera 60. FIG. 4 shows a field surface 40 positioned in a global coordinate system. The global coordinate system is a coordinate system that is fixedly associated with the virtual space. Unless otherwise specified, the field surface 40 represents a field surface 40 (field surface 40 of a field object) on which a field image is projected. The field surface 40 represents a field in the virtual space. Field planes 40 that are discontinuous with each other may be set in the global coordinate system for each of two or more discontinuous space portions.

In this embodiment, the camera parameters include two position parameters (X, Y), a distance parameter A2, an orientation parameter $\theta$, and an angle-of-attack parameter $\psi$. Once the values of all these parameters are determined, the virtual camera 60 can be uniquely positioned with respect to the global coordinate system. When the angle-of-attack parameter $\psi$ is about 90 degrees, bird's-eye view display becomes possible.

The position parameter X is the x-coordinate of the intersection on the xy plane of the line-of-sight direction V, the position parameter Y is the y-coordinate of the intersection on the xy plane of the line-of-sight direction V, and the distance parameter A2 is the distance (distance along the line-of-sight direction V) from the intersection on the xy plane of the line-of-sight direction V to the virtual camera 60. The orientation parameter $\theta$ is an angle formed by the projection vector V' of the line-of-sight direction V on the xy plane and the x-axis. The angle-of-attack parameter $\psi$ is the angle formed by the line-of-sight direction V and the xy plane. In this embodiment, the angle-of-attack parameter $\psi$ is used, but the angle-of-attack parameter $\psi$ may be omitted. That is, the angle-of-attack parameter $\psi$ may have a constant value (fixed value).

Each value of all or a part of such various camera parameters may be changed in conjunction with the values of parameters related to the user avatar M1 (for example, the position or state of the user avatar M1) and/or may be changed according to input from the user. For example, each value of the two position parameters (X, Y) may correspond to the position of the user avatar M1. Note that such camera parameters are an example, and different parameters may be used equivalently in actual processing. For example, camera parameters may include height relative to the xy plane and rotation parameters around three orthogonal axes (that is, yaw, roll, and pitch). The camera parameters may also include other parameters such as focal length or the like.

(Details of Avatar Movement Guidance Function)

In this embodiment, the virtual space can also function as a place for dialog between users via the user avatars M1. In this case, for example, a plurality of users can make a promise in advance and receive the content provided in the specific space portion 70 at a predetermined time. In this case, a plurality of users can interact with each other through the provision of content. Alternatively, a plurality of users can make an appointment in advance, gather at a specific space portion 70 at a predetermined time, and enjoy a conversation (chat, or the like).

Incidentally, in virtual reality, unlike the case of reality, the virtual space can be designed relatively freely, and for example, it is possible to design the virtual space as a space having an expanse by imitating reality. In this case, a relatively large number of space portions can be arranged in the virtual space, a large-scale virtual space such as a mall can be constructed, and the ability to attract customers to the virtual space (number and frequency of user avatars M1 visiting the virtual space) can be enhanced.

However, if the virtual space is designed as a space that has an expanse by imitating reality, the movement distance of each avatar to reach the desired space portion tends to be relatively long. In such a case, it is useful to be able to assist the user avatars M1 in easily reaching the desired space portion.

Therefore, in this embodiment, the virtual reality generation system 1 has an avatar movement guidance function that assists and guides the user avatar M1 so that the user avatar M1 can easily reach a desired space portion or a desired position in the space portion, as described in detail below.

In the following, the server device 10 related to the avatar movement guidance function realizes an example of an information processing system, but as is described below, each element of a specific terminal device 20 (terminal communicator 21 to terminal controller 25 in FIG. 1) may realize an example of an information processing system, or a plurality of terminal devices 20 may cooperate to realize an example of an information processing system. Further, the server device 10 and one or more terminal devices 20 may cooperate to realize an example of an information processing system.

Figure 5:
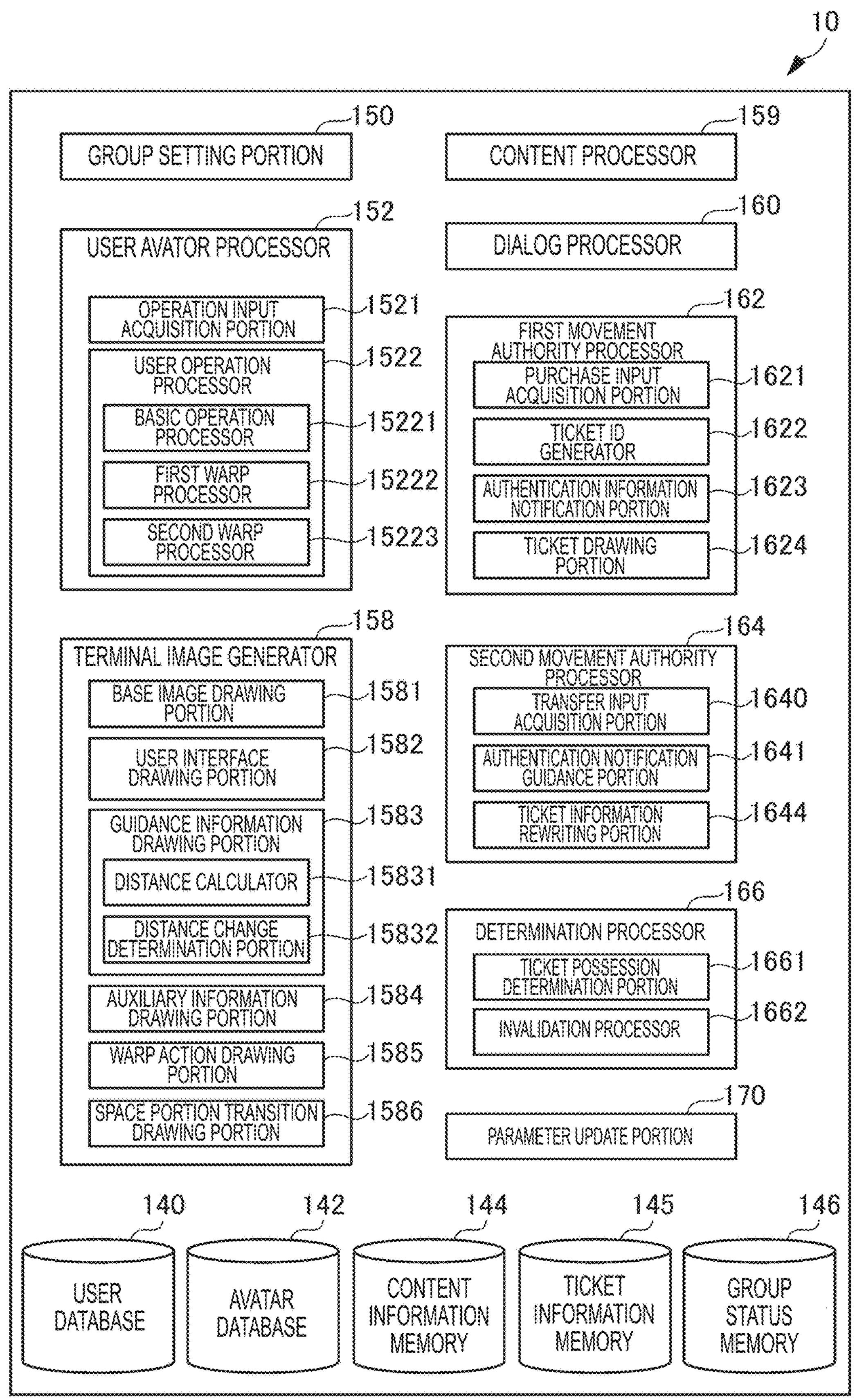
FIG. 5 is an example of a functional block diagram of a server device related to an avatar movement guidance function.
Figure 10:
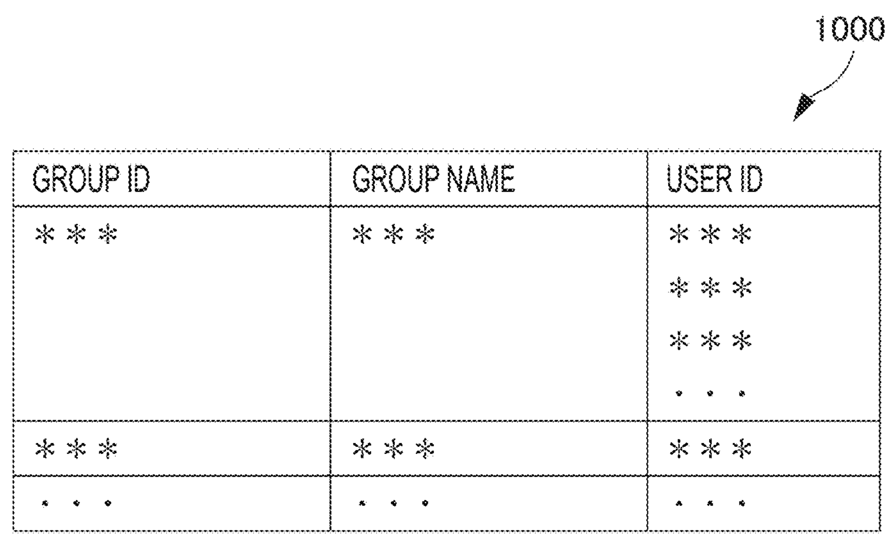
FIG. 10 is an explanatory view of data in a group status memory.

FIG. 5 is an example of a functional block diagram of the server device 10 related to the avatar movement guidance function. FIG. 6 is an explanatory view of data in a user database 140. FIG. 7 is an explanatory view of the data in an avatar database 142. FIG. 8 is an explanatory view of data in a content information memory 144. FIG. 9 is an explanatory view of data in a ticket information memory 145. FIG. 10 is an explanatory view of data in a group status memory 146. In FIGS. 6 to 10, "***" indicates a state in which some information is stored, "-" indicates a state in which no information is stored, and " . . . " indicates repetition of the same.

As shown in FIG. 5, the server device 10 includes a user database 140, an avatar database 142, a content information memory 144, a ticket information memory 145, a group status memory 146, a group setting portion 150, a user avatar processor 152, a terminal image generator 158, a content processor 159, an dialog processor 160, a first movement authority processor 162, a second movement authority processor 164, a determination processor 166 and a parameter update portion 170. Note that some or all of the functions of the server device 10 described below may be appropriately realized by the terminal device 20 (see FIG. 25). Further, the division of the group status memory 146 from the user database 140 and the division of the parameter update portion 170 from the group setting portion 150 are for convenience of explanation, and some functional portions may realize the functions of other functional portions. For example, each function of the group setting portion 150, the user avatar processor 152, the terminal image generator 158, the content processor 159 and the dialog processor 160 may be realized by the terminal device 20. Further, for example, some or all of the data in the user database 140 may be integrated with the data in the avatar database 142, or may be stored in another database.

The group status memory 146 from the user database 140 can be realized by the server memory 12 shown in FIG. 1, and the parameter update portion 170 from the group setting portion 150 can be realized by the server controller 13 shown in FIG. 1. Further, a part of the parameter update portion 170 (the functional portion that communicates with the terminal device 20) from the group setting portion 150 can be realized by the server communicator 11 together with the server controller 13 shown in FIG. 1.

User information is stored in the user database 140. In the example shown in FIG. 6, the user information includes user information 600 related to the user.

In the user information 600, each user ID is associated with a user name, user authentication information, user avatar ID, position/orientation information, friend information, and the like. The user names are names registered by the users themselves and are arbitrary. The user authentication information is information for indicating that the user is a legitimate user, and may include, for example, a password, an email address, a date of birth, a pass code, biometric information, or the like. The friend information may include information (for example, a user ID) that identifies a user having a friend relationship.

The user avatar ID is an ID for identifying the user avatar. In this embodiment, one user avatar ID is associated with each user ID. Therefore, in the following description, the expression "corresponding to the user (or user ID)" or the like is synonymous with the expression "corresponding to the user avatar ID" or the like. In other embodiments, a plurality of user avatar IDs may be associated with one user ID.

The position/orientation information includes location information and orientation information of the user avatar M1. The orientation information may be information indicating the orientation of the face of the user avatar M1. The position/orientation information or the like is information that can be dynamically changed in response to an operation input from the user. In addition to the position/orientation information, information indicating movement of the limbs of the user avatar M1, facial expressions (for example, mouth movements), face and head orientation and line-of-sight direction (for example, eyeball orientation), and information indicating an object such as a laser pointer that indicates an orientation or coordinates in space may be included.

The avatar database 142 stores avatar information related to the user avatar M1.

In the example shown in FIG. 7, for avatar information 700, a face part ID, a hairstyle part ID, a clothing part ID, and the like are associated with each user avatar ID. The parts information related to the appearance such as the face part ID, the hairstyle part ID, and the clothing part ID are parameters that characterize the user avatar M1 and may be selected by each corresponding user. For example, a plurality of types of appearance-related information such as the face part ID, the hairstyle part ID and the clothing part ID related to the user avatar M1 are prepared. As for the face part ID, a part ID may be prepared for each type of face shape, eyes, mouth, nose, and so forth, and the information related to the face part ID may be managed by the combination of the IDs of the parts constituting the face. In this case, each user avatar M1 can be drawn not only on the server device 10 but also on the terminal device 20 side based on each ID related to the appearance associated with each avatar ID.

The content information memory 144 stores various content information related to the content that can be provided in the virtual space. For example, for each content, the content provision position (for example, the ID of the space portion), which is the position at which the content is provided, and the content and the like, are stored.

In the example shown in FIG. 8, content information 800 is such that a content provision position (denoted as "provision position" in FIG. 8), content details (denoted as "content" in FIG. 8), and the like are associated with each content ID.

The content provision position is a position in the virtual space and includes a position where the user can receive provision of the content via the content processor 159. That is, the content provision position includes a position where provision of the content can be received. The content provision position may be defined by the coordinate values of one point but is typically defined by a plurality of coordinate values forming a group of regions or space portions. Further, the content provision position may be a position on a plane or a position in space (that is, a position represented by a three-dimensional coordinate system including the height direction). An item of content associated with one content provision position is considered one content (one item of content). Therefore, for example, even if two types of moving images can be viewed at a certain content provision position, the entirety of the two types of moving images is one item of content.

The content details may include information such as the content name, overview, creator, and the like.

The content information memory 144 may further store information representing a condition (hereinafter, also referred to as "content provision condition") that must be satisfied in order to receive the provision of each item of content at each content provision position. A content provision condition may be set for each content ID. A content provision condition may be set based on the provision time, the necessity of a ticket, age, or the like.

Ticket information (an example of authority information) related to a ticket is stored in the ticket information memory 145. The ticket is a virtual reality medium that represents movement authority (and thus, authority to receive the content provided at the content provision position) for the user avatar M1 to move to a content provision position in the virtual space (for example, one or more positions in the space portion). A ticket management screen displayed by operating a ticket management button 303, which is described below with reference to FIG. 3, and a ticket state 1880 in the group information display region 3000, which is described below with reference to FIG. 18, may be generated based on data in the ticket information memory 145.

In the example shown in FIG. 9, in ticket information 900, a content provision position, an owner ID, purchase information, authentication information for transfer, transfer information, a validity flag, and the like are associated with a ticket ID.

The ticket ID is a unique ID given to each ticket.

The content provision position represents a position in the virtual space that can be located based on the movement authority related to the ticket. The content provision position includes the position where provision of the content can be received. The content provision position may be defined by the coordinate values of one point but is typically defined by a plurality of coordinate values forming a group of regions or space portions. Further, the content provision position may be a position on a plane or a position in space (that is, a position represented by a three-dimensional coordinate system including the height direction). The content provision position may be typically set for each item of content according to the provision position and the attributes of the content.

The ticket information 900 shown in FIG. 9 is suitable when a plurality of types of content provision positions are associated with each other, for example, a plurality of space portions 70 shown in FIG. 2. When there is only one type of content provision position, the content provision position in the ticket information 900 may be omitted.

The owner ID corresponds to the user ID related to the user who currently possesses the ticket. Since the ticket is transferable as described above, the owner ID can change after the fact.

The purchase information represents a purchaser ID, purchase date and time, purchase method, and the like. The purchaser ID is the user ID associated with the user who made the purchase input.

The authentication information for transfer is the authentication information required for transfer, and is information that differs for each ticket ID.

The transfer information may indicate whether or not a transfer has been made one or more times, and may further indicate the date and time of the transfer. In FIG. 9, "-" indicates that a transfer has not been made.

The validity flag is flag information indicating the validity of the ticket. In this embodiment, as an example, when the validity flag is "1", the ticket is valid, and when the validity flag is "0", the ticket is invalid. The state of the ticket being valid corresponds to a state in which the user avatar M1 associated with the ticket can move to the content provision position associated with the ticket (and a state in which provision of the specific content can be accordingly received at the content provision position).

The validity of the ticket may be set for each attribute of the ticket. For example, a ticket of a certain attribute may be invalidated at a time when a corresponding user avatar M1 (for example, the user avatar M1 associated with the purchaser ID) reaches the content provision position (or a time immediately thereafter, and a time when the content provision position is reached). Further, the ticket of another attribute may be invalidated when a predetermined time has elapsed from the time when the corresponding user avatar M1 reaches the content provision position. Further, the ticket of another attribute may be invalidated when the corresponding user avatar M1 reaches the content provision position and then leaves the content provision position. Alternatively, a mechanism that allows re-entry with the same ticket may be further realized. In this case, the validity of the ticket may be maintained from the time when the corresponding user avatar M1 reaches the content provision position until a predetermined time elapses. Alternatively, the validity of the ticket may be invalidated when movement (entrance) into the content provision position more than a predetermined number of times is detected.

The group status memory 146 stores group status information regarding the state of a group active in the virtual space. The group is set by the group setting portion 150 described below. In the example shown in FIG. 10, the group status information 1000 is associated with a corresponding group name and user IDs (user IDs related to users belonging to the corresponding group) for each group ID. A plurality of user IDs may be associated with one group ID. A group may be called a party.

The group setting portion 150 sets a group constituted by one or more users who interact with each other in the virtual space. For example, when each user enters the virtual space via the user avatar M1, a group name is input. In this case, the group setting portion 150 may set a group ID for each group name and set users who have input the same virtual space name as the same group. In this case, the virtual space may be created for each group so that each user in the group can share one virtual space for each group. As a result, for example, a plurality of users who want to interact in a virtual space can input a common virtual space name communicated in advance without interacting with other users (users in different groups). Further, since the virtual space can be managed for each group, the amount of information of other users transmitted to the terminal device 20 associated with one user can be reduced as compared with the case where one virtual space is shared by many users, so the communication load of the virtual reality generation system 1 as a whole can be reduced. In a modified example, one virtual space may be available to users belonging to a plurality of groups at the same time. In the following, unless otherwise specified, each user avatar M1 belongs to the same group.

Further, when one user enters the virtual space via the user avatar M1, the group setting portion 150 may display group information in the current setting to the terminal device 20 associated with the one user in cooperation with the terminal image generator 158. In this case, the group information may include information representing the group name and the members thereof (user names, and the like). Further, the display of the group name may function as a selection button. In this case, a user who finds the display of the desired group name can easily participate in the desired group by operating the corresponding selection button. Participation in the group may require permission from a user(s) who is a member of the group.

Further, in another embodiment, the group setting portion 150 may assign each user to one of a plurality of groups without being based on the input from the user. In this case, the assignment may be realized so that the number of users belonging to one group can be equalized. As a result, the balance of the processing load for each group can be equalized. At this time, the group setting portion 150 may assign users whose entry times are close to each other to the same group, or may realize assignment according to user attribute information (age, gender, preferences, or the like).

The user avatar processor 152 executes various processes related to each user avatar M1. The user avatar processor 152 includes an operation input acquisition portion 1521 (an example of an acquisition portion) and a user operation processor 1522 for each user avatar M1.

The operation input acquisition portion 1521 acquires the operation input information generated in response to various operations by the user. The operation input information from the user is generated via the input portion 24 of the above-described terminal device 20.

In this embodiment, the operation input information may include the value of an operation input (an example of a first input) that changes the position of the user avatar M1 in the virtual space, an operation input that changes the value of other parameters (parameters other than movement) such as the orientation of the user avatar M1, an operation input generated via the user interface drawn by the user interface drawing portion 1582, a voice or text input used by the dialog processor 160, or the like. The operation input generated via the user interface includes a warp input (an example of a second input) generated via a below-described warp button 1800.

The operation input for changing the position of the user avatar M1 in the virtual space is an operation input for moving the user avatar M1, and is also referred to below as a "movement operation input". Further, hereinafter, the operation input for changing the value of other parameters (parameters other than movement) such as the orientation of the user avatar M1 is also referred to as an "avatar-related input". The movement operation input and the avatar-related input may be generated by operating a specific key (for example, the "WASD" keys), may be generated via a user interface including an arrow button(s) or the like, or may be generated by voice or movements such as gestures or the like.

In this embodiment, the user operation processor 1522 includes a basic operation processor 15221 (an example of a position changing portion), a first warp processor 15222 and a second warp processor 15223.

The basic operation processor 15221 determines the position and orientation of each user avatar M1 in the virtual space based on the operation input information (movement operation input and avatar-related input) acquired by the operation input acquisition portion 1521. The position/orientation information of each user avatar M1 determined (generated) by the basic operation processor 15221 may be stored (updated) in association with, for example, the corresponding user ID (see FIG. 6). Further, the basic operation processor 15221 may determine various movements of the user avatar M1 such as a hand and a face or the like based on the operation input information. In this case, the movement information may be stored (updated) together with the position/orientation information of the user avatar M1.

When one user avatar M1 moves into a warp region (an example of a predetermined region) in a virtual space, the first warp processor 15222 performs a process (hereinafter referred to a "first warp process") that causes the one user avatar M1 to move to a first predetermined position separated from the warp region by at least a predetermined distance D1, or to a first predetermined position in a space portion different from the space portion to which the warp region belongs. The first warp process for the one user avatar M1 accompanies changing at least the position information, among the position/orientation information of the one user avatar M1.

In this case, the predetermined distance D1 is a relatively large distance, and for example may be significantly larger than the maximum distance that the user avatar M1 can move by the movement operation input alone per the time corresponding to the processing time of the first warp processing. The distance determined by the predetermined distance D1 (distance from the warp region to the first predetermined position) may be a straight-line distance or a distance along the movement path of the user avatar M1.

In this embodiment, the first predetermined position is set as another warp region. That is, in this embodiment, the user avatar M1 can move directly between the two warp regions. The time required to directly move back and forth between the two warp regions is significantly shorter than the time required to move the user avatar M1 based on the movement operation input for the distance between the two warp regions. As a result, the user can realize efficient movement by utilizing the warp regions. In a modified example, the first predetermined position may not be a warp region, such that a warp in only one direction is enabled. A plurality of warp regions may be set, and only a part of the warp regions may be enable warp in only one direction.

Figure 11A:
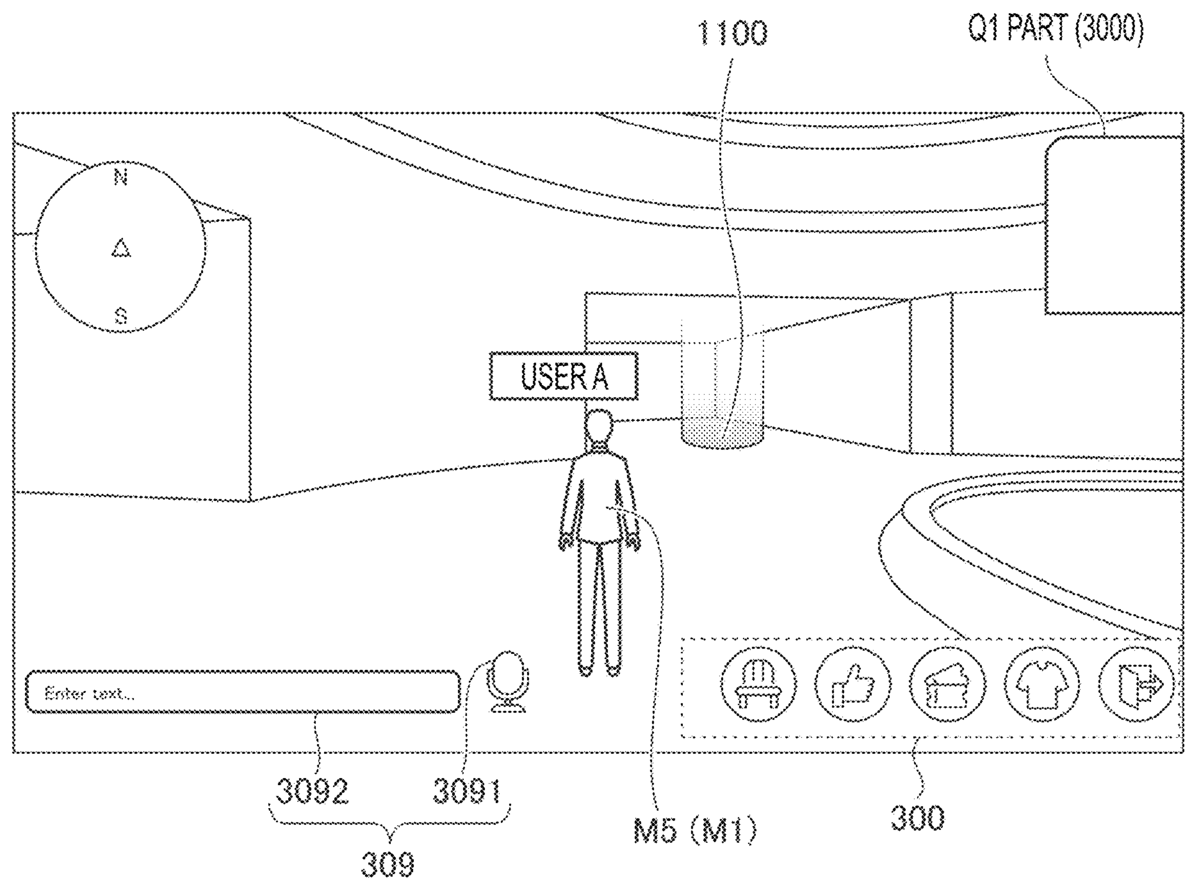
FIG. 11A is an explanatory view of an example of a terminal image including a warp region.

FIG. 11A shows an example of a terminal image including a warp region 1100 in the virtual space shown in FIG. 2. The position of the warp region 1100 may be fixed or may be changed as appropriate. Further, the warp region 1100 may appear when a predetermined appearance condition is satisfied. The destination from the warp region 1100 may be set for each warp region 1100. The destination from the warp region 1100 does not necessarily have to be a space portion different from the space portion to which the current position belongs (for example, a discontinuous space portion), and may be set in the same space portion as the space portion to which the current position belongs.

In this embodiment, as described above, a warp region corresponding to the one warp region 1100 is set in the space portion of the destination or the like in a manner in which the two warp regions can be directly traversed between. In this case, bidirectional movement through the warp regions is possible. For example, FIG. 2 schematically shows a pair of warp regions 1100-1 and 1100-2. In this case, by moving into one of the warp regions 1100-1 and 1100-2, an instantaneous movement to the other warp region (hereinafter referred to as "instantaneous movement") can be realized. Instantaneous movement between two points (for example, instantaneous movement between the paired warp regions 1100-1 and 1100-2) is a movement mode that cannot be realized in reality, and for example, refers to a movement mode in which movement is possible in a significantly shorter time than the shortest time needed when the user avatar M1 is moved between two points by a movement operation input.

In the example shown in FIG. 2, the two warp regions 1100 are set in the free space portion 71, but all or a part of the plurality of warp regions may be set in the space portion(s) 70. Further, there may be two or more destinations to which instantaneous movement is possible from one warp region, and these may be selectable by the user or may be randomly selected.

When one user avatar M1 is positioned in a specific region in the virtual space, the second warp processor 15223 performs a process (hereinafter referred to as a "second warp process") that causes the user avatar M1 to move to a second predetermined position in accordance with warp input from the user associated with the one user avatar M1 (that is, a user who operates the one user avatar M1). In this case, the second predetermined position may be set in the space portion to which the specific region belongs or may be set in a space portion different from the space portion to which the specific region belongs. The second predetermined position may be fixed or variable. The second warp process for one user avatar M1 accompanies changing at least the position information, among the position/orientation information of the one user avatar M1.

In this embodiment, the second predetermined position is set for each user avatar M1. The second predetermined position set for one user avatar M1 may be set according to the position of another user avatar M1 having a predetermined relationship with the one user avatar M1. The predetermined relationship is arbitrary, but in this embodiment, as an example, includes a relationship of belonging to the same group set by the group setting portion 150. In other embodiments, from the same point of view, the predetermined relationship may include a friend relationship. Hereinafter, another user avatar M1 having a predetermined relationship with one user avatar M1 is also referred to as a "friend avatar".

In this case, the second predetermined position set for one user avatar M1 may for example be set within a predetermined distance D2 with respect to the position of the friend avatar. In this case, the predetermined distance D2 may be a relatively small distance, for example, a distance such that a friend avatar is drawn immediately after the second warp process in the terminal image for the user related to one user avatar M1. In this case, the one user avatar M1 can instantaneously move to the side of the friend avatar. In this case, the position of the movement origin of the one user avatar M1 may be a position in the space portion where the friend avatar is located, or may be a position in a space portion different from the space portion where the friend avatar is located. The second predetermined position, which is the movement destination of the one user avatar M1, is arbitrary as long as within the predetermined distance D2 with respect to the position of the friend avatar, but may have a predetermined positional relationship with respect to the position of the friend avatar, such as within the predetermined distance D2 with respect to the position of the friend avatar and at a position behind or to the side of the friend avatar.

According to such a second warp process, even if it is difficult for the user to move the user's user avatar M1 to the side of the friend avatar by the movement operation input, it is possible to move the user avatar M1 to the side of the friend avatar by simply operating the below-described warp button 1800, improving convenience. Such convenience is particularly remarkable when the virtual space is wide and a large number of space portions is arranged in the virtual space. Further, since the drawing process for drawing the relatively long moving process of the user avatar M1 by the movement operation input can be omitted through the second warp process, the effect of reducing the processing load can also be obtained. Further, in the terminal device 20 as well, it is possible to reduce the processing load related to drawing and the power consumption (decrease in the charging state of the power supply) associated therewith.

The second warp process can reduce the load of the movement operation input by the user (and the load of the drawing process associated therewith) in this way, but on the other hand, can reduce the opportunity for new discoveries (for example, the appearance of new space portions or changes in the second object M3 such as decorations) when the user avatar M1 moves in the virtual space, and the opportunity to provide various information necessary or useful in the free space portion 71 (for example, contents related to tutorials and advertisements in the free space portion 71, second objects M3, newly established space portions 70, and the like).

Therefore, the second warp process may be enabled when a predetermined warp condition is satisfied. The predetermined warp condition is arbitrary, but for example, the predetermined warp condition may be adapted so as to be satisfied when the load of the movement operation input by the user is relatively high. For example, the predetermined warp condition may be satisfied when the distance to the friend avatar is a predetermined distance D3 or greater, or when the friend avatar is located in a space different from the user avatar M1 (the user avatar M1 that is the target of the second warp process). The distance of the user avatar M1 to the friend avatar may be calculated based on the position information, among the position/orientation information of each user avatar M1.

The terminal image generator 158 draws each virtual reality medium (for example, the user avatar M1) that can move in the virtual space. Specifically, the terminal image generator 158 generates a terminal image displayed on the terminal device 20 related to each user based on the avatar information 700 (see FIG. 7) and the position/orientation information of each user avatar M1.

For example, for each user avatar M1, the terminal image generator 158 generates an image (terminal image) that is displayed on the terminal device 20 related to the user associated with one user avatar M1 based on the position/orientation information of the one user avatar M1. Specifically, the terminal image generator 158 generates, as the terminal image, an image of a virtual space (image cutting out a part of the virtual space) viewed from the virtual camera 60 at a position and orientation corresponding to the position/orientation information, based on the position/orientation information of the one user avatar M1. In this case, since the position/orientation information related to each user avatar M1 mutually differs, the terminal image is different for each user related to each user avatar M1. In consideration of this point, in the following, the terminal image generated based on the position/orientation information of the user avatar M1 related to a certain user may be referred to as a terminal image for one user. Hereinafter, unless otherwise specified, the function of the terminal image generator 158 when generating a terminal image related to one user (and the user avatar M1 associated therewith) will be described, but the case in which a terminal image relating to another user is generated is substantially the same.

The terminal image generator 158 may have a plurality of modes such as a first-person viewpoint mode and a third-person viewpoint mode. For example, in the first-person viewpoint mode, the terminal image generator 158 adjusts the position and orientation of the virtual camera 60 (each value of the camera parameters) to the position and orientation corresponding to the position/orientation information of one user avatar M1. In this case, the field of view of the virtual camera 60 substantially matches the field of view of the one user avatar M1. In this case, the user avatar M1 does not appear in the field of view from the virtual camera 60.

On the other hand, in the third person viewpoint mode, the terminal image generator 158 adjusts the position of the virtual camera 60 to a position slightly away from the position of one user avatar M1. At this time, the terminal image generator 158 may appropriately determine each value of the other camera parameters of the virtual camera 60 according to the orientation of the position/orientation information of one user avatar M1, the situation in the virtual space, and the like. At this time, the position of the virtual camera 60 may be set to a position slightly separated from the rear or the side of the user avatar M1 so as to generate a terminal image in which the user avatar M1 appears.

Further, in other modes, the values of various camera parameters of the virtual camera 60 may be arbitrarily adjusted by the corresponding user. When generating such a terminal image, the terminal image generator 158 may execute various processes (for example, a process of bending a field object) in order to give a sense of depth and the like. Further, when generating a terminal image in which the user avatar M1 appears, the user avatar M1 may be drawn in a relatively simple manner (for example, in the form of a two-dimensional sprite) in order to reduce the load of the drawing process.

When another user avatar M1 is located in the field of view from the virtual camera 60, the terminal image generator 158 generates a terminal image including the other user avatar M1. However, in this case, the other user avatar M1 may be drawn in a relatively simple manner (for example, in the form of a two-dimensional sprite) in order to reduce the load of the drawing process.

The terminal image generator 158 may draw a user name (for example, "user A" in FIG. 3) in association with each user avatar M1. As a result, each user can specify the user avatar M1 related to the desired user based on the user name. The user name may be hidden based on settings by the user.

In this embodiment, the terminal image generator 158 includes a base image drawing portion 1581, a user interface drawing portion 1582, a guidance information drawing portion 1583, an auxiliary information drawing portion 1584, a warp action drawing portion 1585, and space portion transition drawing portion 1586.

The base image drawing portion 1581 draws the basic part of the terminal image as described above. That is, the base image drawing portion 1581 draws the basic part before drawings by each of the user interface drawing portion 1582, the guidance information drawing portion 1583, and the auxiliary information drawing portion 1584 are superimposed. For example, the base image drawing portion 1581 draws the virtual space itself (the part excluding the second object(s) M3 and the like) and the various objects in the virtual space (the user avatar(s) M1, the second object(s) M3 and the like) within the field of view of the virtual camera 60 based on the drawing information of the virtual space, the value of each camera parameter of the virtual camera 60, the position/orientation information of each user avatar M1, the arrangement information of the second object(s) M3, and the like. The drawing information of the virtual space may be prepared in advance but may be updated after the fact or dynamically. Each position in the virtual space may be defined in the global coordinate system (see FIG. 4). The drawing method of the virtual space is arbitrary, but may be realized by, for example, mapping a field object or a background object to an appropriate plane, curved surface, or the like.

The user interface drawing portion 1582 draws a user interface with which various operations are possible by the user. Items that can be manipulated via the user interface are arbitrary. For example, in the example shown in FIG. 3, the user interface 300 includes a chair button 301, a like button 302, a ticket management button 303, a friend management button 304 and an exit button 305. Further, in the example shown in FIG. 3, the terminal image includes a dialog interface 309, which is another user interface.

The chair button 301 is operated when a user avatar M1 is seated in the virtual space. For example, each user can use the chair button 301 when the users want to talk without rushing via the user avatars M1. In this case, when the user avatars M1 are seated, the sound in the virtual space (for example, predetermined music that is always played) may disappear, and only voice chat (dialog by voice) may be possible.

The like button 302 is operated when giving a good evaluation, a gift, or the like to another user avatar M1 via the user avatar M1.

The ticket management button 303 is operated when causing the output of a ticket management screen (not shown) that allows viewing of various states of below-described tickets. A further user interface capable of inputting a transfer, inputting a request, inputting authentication information for transfer, and the like, which are described below, may be set on the ticket management screen.

The friend management button 304 is operated when causing the output of a friend management screen (not shown) relating to another user avatar M1 having a friend relationship.

The exit button 305 is operated when exiting the user avatar M1 from the virtual space.

Figure 3A:
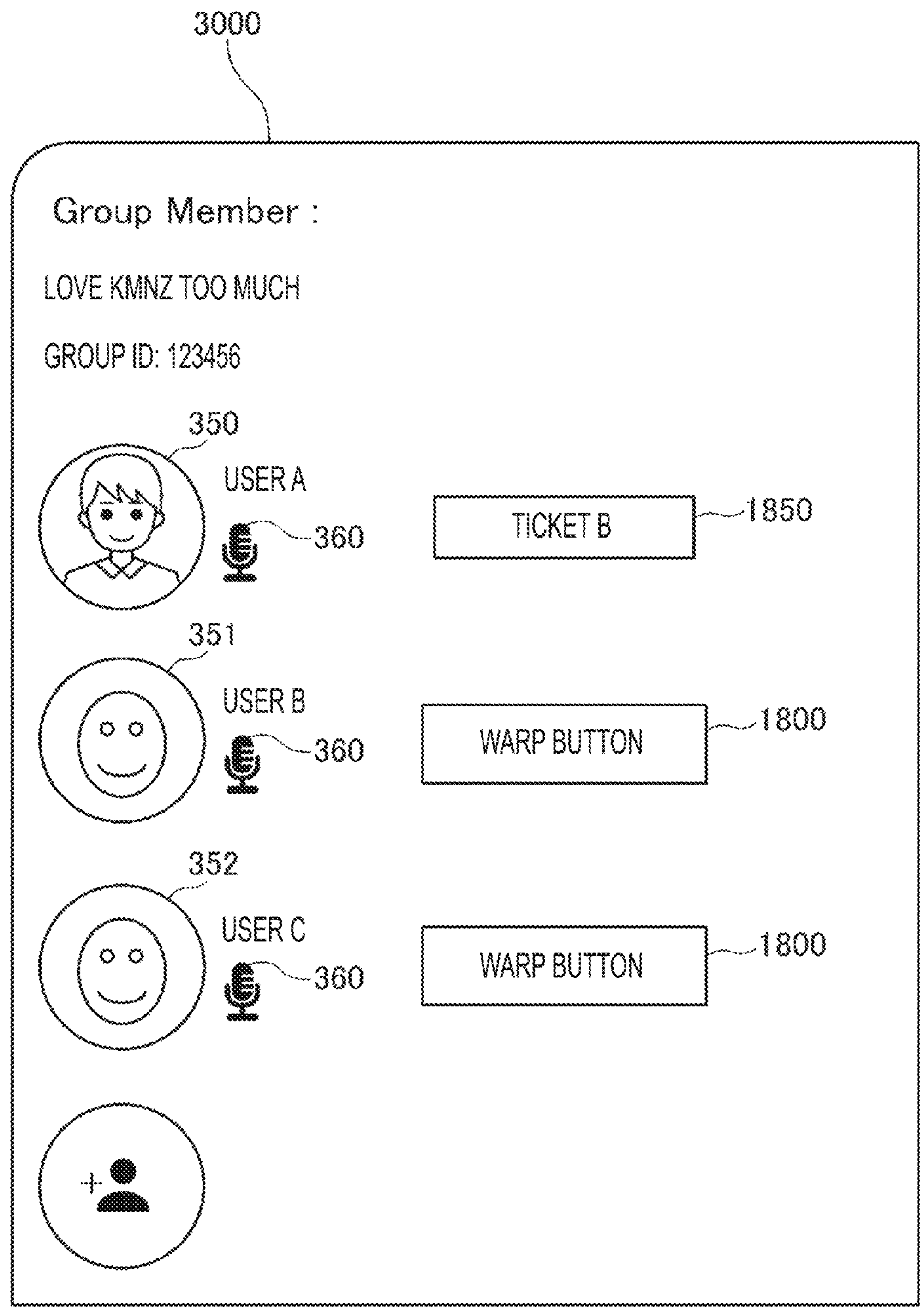
FIG. 3A is an explanatory view of a group information display region that is one portion (Q1 portion) of the terminal image shown in FIG. 3.

Further, in this embodiment, the user interface drawing portion 1582 draws the warp button 1800 (an example of the first operation portion) (see FIG. 3A). The warp button 1800 is operated when the above-described second warp processor 15223 performs instantaneous movement by second warp processing. That is, the warp button 1800 is operated when generating a warp input.

The warp button 1800 may be drawn at an arbitrary position on the terminal image but is preferably drawn in association with the corresponding friend avatar. For example, the warp button 1800 for instantaneous movement to the side of one friend avatar is drawn in association with the one friend avatar. This allows the user to easily identify the warp button 1800 for instantaneous movement to the side of the desired friend avatar, even if there are multiple friend avatars.

FIG. 3A shows a group information display region 3000 which is a part (Q1 part) of the terminal image shown in FIG. 3. The group information display region 3000 may be displayable in full screen by, for example, an operation by a user (for example, a tap operation). The group displayed in the group information display region 3000 corresponds to the group set by the group setting portion 150. The group information display region 3000 includes avatar icons 350, 351 and 352 of each user avatar M1 in the same group. Each of the avatar icons 350, 351 and 352 is associated with a corresponding user name (for example, "user A", "user B", and so forth). In this case, a warp button 1800 is drawn in association with each avatar icon 351 and 352 of the corresponding friend avatar (in this case, "user B" and "user C" for the principal "user A").

The user interface drawing portion 1582 may draw the warp button 1800 in an operable display mode when a predetermined warp condition is satisfied, and may draw the warp button 1800 in an inoperable display mode when the predetermined warp condition is not satisfied. For example, in the inoperable display mode, the warp button 1800 may be drawn with significantly lower brightness (or a different color than usual) as compared with the operable display mode (see warp button 1800-1 in below-described FIG. 18). In this case, the user can easily grasp whether or not the warp button 1800 is in an active state. When the user operates the warp button 1800 drawn in the operable display mode, the warp input is normally generated and acquired by the operation input acquisition portion 1521. Further, when the user operates the warp button 1800 drawn in the inoperable display mode, the warp input is not generated.

As described above, the predetermined warp condition may be adapted so as to be satisfied, for example, when the load of the movement operation input by the user is relatively high. In this case, the predetermined warp condition may be determined for each friend avatar when a plurality of friend avatars exists.

In this embodiment, as an example, the predetermined warp condition is satisfied when the user avatar M1 is located in a specific region in the virtual space, the friend avatar exists in the virtual space, and an invalidation instruction is not generated from the below-described invalidation processor 1662. The specific region may be set for each friend avatar so as to be significantly separated from the second predetermined position for each friend avatar, but in this embodiment, the specific region is an arbitrary position in the virtual space. In this case, as long as the user avatar M1 is located in the virtual space, the user avatar M1 will be located in the specific region (that is, the current position of the user avatar M1 will always be included in the specific region). As a result, the predetermined warp condition can be satisfied regardless of the position of the user avatar M1, so that the processing load for determining the predetermined warp condition can be reduced. Also, from the user's point of view, it is possible to perform instantaneous movement by the second warp processing at the current position, and convenience is improved compared to the specification that instantaneous movement cannot be performed unless the user avatar M1 is purposefully moved to a position different from the current position.

The guidance information drawing portion 1583 draws guidance information that realizes the avatar movement guidance function. The guidance information is information for assisting and guiding the user's movement operation input corresponding to the user avatar M1 so that the user avatar M1 can easily reach the desired space portion or a desired position in the space portion.

In this embodiment, the guidance information is information for assisting and guiding the user avatar M1 to smoothly move to the side of another user avatar M1. Specifically, the guidance information represents the positional relationship between the user avatar M1 and another user avatar M1. In this case, the guidance information drawing portion 1583 draws the guidance information in association with each of the user avatars M1.

In the following, with respect to the guidance information, the user avatar M1 on the side of being guided to the side of the other user avatar M1 is also referred to as a "guidance target user avatar M5" (an example of a first display medium), and the other user avatar M1 is also referred to as a "preceding user avatar M6" (an example of a second display medium).

In this embodiment, the guidance target user avatar M5 and the preceding user avatar M6 have a predetermined relationship. The predetermined relationship may be the same as the predetermined relationship related to the friend avatars described above. In this case, the guidance target user avatar M5 and the preceding user avatar M6 belong to the same group and are friend avatars of each other. The distinction between the guidance target user avatar M5 and the preceding user avatar M6 is for the sake of explanation, and for example, when the preceding user avatar M6 goes to meet the guidance target user avatar M5, the preceding user avatar M6 becomes the "guidance target" that is guided to the side of the guidance target user avatar M5 based on the guidance information.

Guidance information preferably includes lines or curves. Lines or curves are drawn in the virtual space in association with the guidance target user avatar M5. For example, the lines or curves may be drawn on the field surface 40 (the portion corresponding to the ground) in the virtual space, or may be drawn in space in the virtual space.

When there is a plurality of guidance target user avatars M5, the guidance information may be generated and drawn for each guidance target user avatar M5. However, when a plurality of guidance target user avatars M5 is present at substantially the same position, all or part of the guidance information related to the plurality of guidance target user avatars M5 may be integrated.

The lines or curves related to the guidance information may be drawn starting from the guidance target user avatar M5.

For example, one end of a line or curve related to the guidance information is associated with the guidance target user avatar M5, and the other end is associated with the preceding user avatar M6. As a result, the user related to the guidance target user avatar M5 can easily cause the guidance target user avatar M5 to move to the side of the preceding user avatar M6 by performing the movement operation input so that movement of the guidance target user avatar M5 in a manner of following the line or curve is realized.

However, when the preceding user avatar M6 is not drawn on the terminal image for the user related to the guidance target user avatar M5, one end of the line or curve related to the guidance information may be associated with the guidance target user avatar M5, and the other end may extend to a position suggesting the position of the preceding user avatar M6. In this case, the other end may be set at the edge of the terminal image for the user related to the guidance target user avatar M5. In this case, when the guidance target user avatar M5 moves, a state may be realized in which the other end of the line or curve related to the guidance information extends to the edge of the terminal image updated in correspondence therewith.

Further, the line or curve related to the guidance information may be drawn along a recommended route. In this case, the recommended route may be a route that does not pass through an object related to an obstacle such as a fountain object or the like (that is, a route along which the user avatar M1 can move without trouble). In this case, it is possible to generate guidance information along the recommended route with little trouble. As a result, efficient movement is realized, so that the processing load related to movement of the user avatar M1 can be reduced.

Further, the recommended route may be set to pass through a content provision place that provides content desired to be shown to the user such as an advertisement. As a result, while supporting the movement of the user avatar M1 along the recommended route, it becomes possible to transmit various necessary or useful information (for example, content or second objects M3 in the free space portion 71) to the user via the user avatar M1. Further, from such a viewpoint, the recommended route may be calculated by a route that can pass through an object related to an obstacle such as a fountain object or the like (for example, the shortest route). In this case, the user related to the guidance target user avatar M5 will be able to watch the situation in the virtual space, think for himself and operate, and as a result, the possibility that various necessary or useful information can be transmitted to the user can be increased.

The guidance information may include supplementary guidance information in association with the above-described line or curve. The supplementary guidance information may be distance information between the guidance target user avatar M5 and the preceding user avatar M6, or distance change information indicating the changing state of this distance, as positional relationship between the guidance target user avatar M5 and the preceding user avatar M6.

The distance information is, for example, in the form of a numerical value, but may be in another form such as a gauge. The distance change information may be expressed by the length, color, thickness or the like of the line or curve. For example, if the distance increases, the length of the line or curve may be extended, and if the distance decreases, the length of the line or curve may be shortened. Alternatively, if the distance is increased, the color may be a particular color (for example, red), and if the distance is reduced, the color may be another particular color (for example, blue). Further, the distance change information may be drawn in association with the line or curve, separately from the line or curve. For example, the distance change information may be drawn as text information in which direct text is associated with the line or curve, such as "increase" or "decrease". In this case, the distance change information may be drawn (updated) only when the amount of change in the distance exceeds a predetermined amount. As a result, it is possible to reduce inconvenience when the distance change information is updated at a relatively high frequency (for example, an increase in the processing load or annoyance in displays due to frequent replacement of increases and decreases, and the like).

Figure 11B:
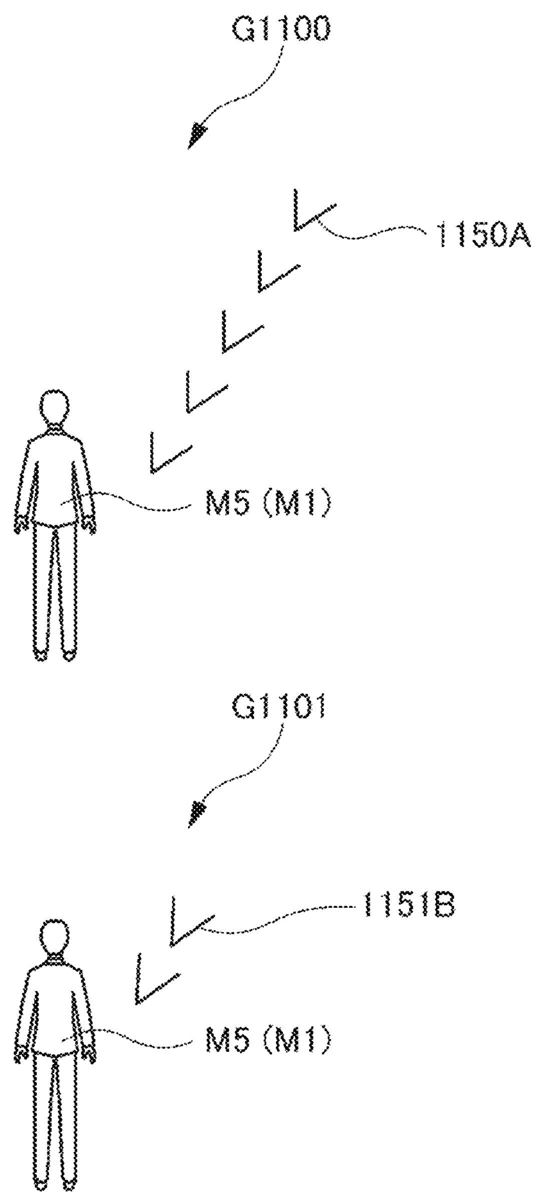
FIG. 11B is an explanatory view of an example of distance information.
Figure 11C:
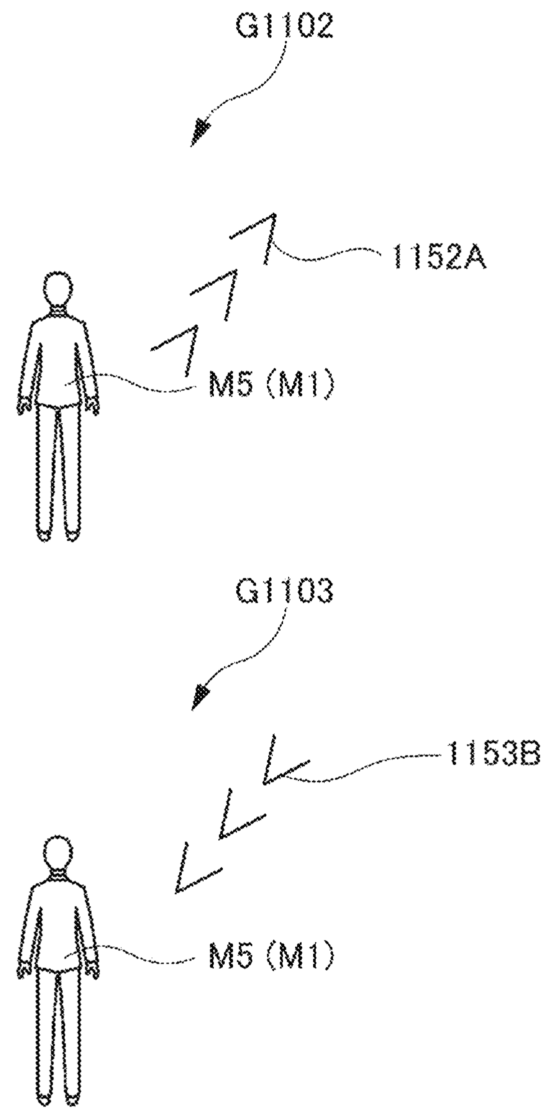
FIG. 11C is an explanatory view of another example of distance information.

FIG. 11B is an explanatory view of an example of distance information, and FIG. 11C is an explanatory view of an example of distance change information, both of which are diagrams showing a part of the terminal image. FIG. 11B and FIG. 11C show examples of distance information or distance change information drawn in association with the guidance target user avatar M5.

Specifically, FIG. 11B shows an example of distance information in which a sense of distance is represented by marks such as V-shaped marks. In this case, a part G1100 of the terminal image shows distance information 1150A when the distance between the guidance target user avatar M5 and the preceding user avatar M6 is relatively large, and the part G1101 of the terminal image shows the distance information 1151B when the distance between the guidance target user avatar M5 and the preceding user avatar M6 is relatively small. In this way, the distance information may be drawn in such a manner that the number of marks such as V-shaped marks increases as the distance between the guidance target user avatar M5 and the preceding user avatar M6 increases. The extending direction of the marks related to the distance information 1150A and 1151B as a whole may represent the direction in which the guidance target user avatar M5 exists. That is, the distance information 1150A and 1151B may function as a line or a curve related to the guidance information. Further, the luminance and color of the marks related to the distance information 1150A and 1151B may be changed in sequence in a manner indicating the flow. This makes it possible to realize intuitive and easy-to-understand guidance information.

Further, FIG. 11C shows an example of distance change information in which the relative position is represented by marks such as V-shaped marks. In this case, the part G1102 of the terminal image shows distance change information 1152A when the distance between the guidance target user avatar M5 and the preceding user avatar M6 is extended, and the part G1103 of the terminal image shows the distance change information 1153B when the distance between the guidance target user avatar M5 and the preceding user avatar M6 is shortened. That is, the distance change information 1152A indicates that the preceding user avatar M6 has moved away, and the distance change information 1153B indicates that the preceding user avatar M6 has approached. In this way, the distance change information may be transmitted to the user related to the guidance target user avatar M5 depending on the direction of the marks such as the V-shaped marks. Similar to the distance information 1150A and 1151B described above, the extending direction of the marks related to the distance change information 1152A and 1153B as a whole may represent the direction in which the guidance target user avatar M5 exists. That is, the distance change information 1152A and 1153B may function as a line or a curve related to the guidance information. Further, the luminance and color of the marks related to the distance change information 1152A and 1153B may be changed in sequence in a manner indicating the flow.

In this embodiment, the guidance information drawing portion 1583 includes a distance calculator 15831 and a distance change determination portion (an example of a second determination portion) 15832 in order to generate supplementary guidance information.

The distance calculator 15831 calculates the distance (distance in the global coordinate system (see FIG. 4)) between the guidance target user avatar M5 and the preceding user avatar M6. The distance calculator 15831 may calculate the distance between each user avatar M1 in the group at predetermined intervals based on the group status information 1000. In this case, the above-described distance information can be generated based on the calculation result by the distance calculator 15831. The distance to be calculated may be a straight-line distance or a distance along the movement path of the user avatar M1. The calculation result by the distance calculator 15831 may be used for other purposes (for example, determination of the above-described predetermined warp condition).

The distance change determination portion 15832 determines whether or not the distance between the guidance target user avatar M5 and the preceding user avatar M6 is shortened based on the distance change state calculated by the distance calculator 15831. For example, the distance change determination portion 15832 may determine whether or not the distance between the guidance target user avatar M5 and the preceding user avatar M6 is shortened at each predetermined processing cycle. The distance that is the determination target may be only the distance between the guidance target user avatar M5 and the preceding user avatar M6 of each set in which the guidance information is output. In this case, the above-described distance change information can be generated based on the determination result by the distance change determination portion 15832. Further, in this case, the processing load can be reduced by limiting the distance that is the determination target.

In a modified example, the supplementary guidance information may include time information (for example, the minimum time required to reach the preceding user avatar M6) in place of or in addition to the distance information.

Here, some examples of guidance information will be described with reference to FIGS. 12 to 15.

Figure 12:
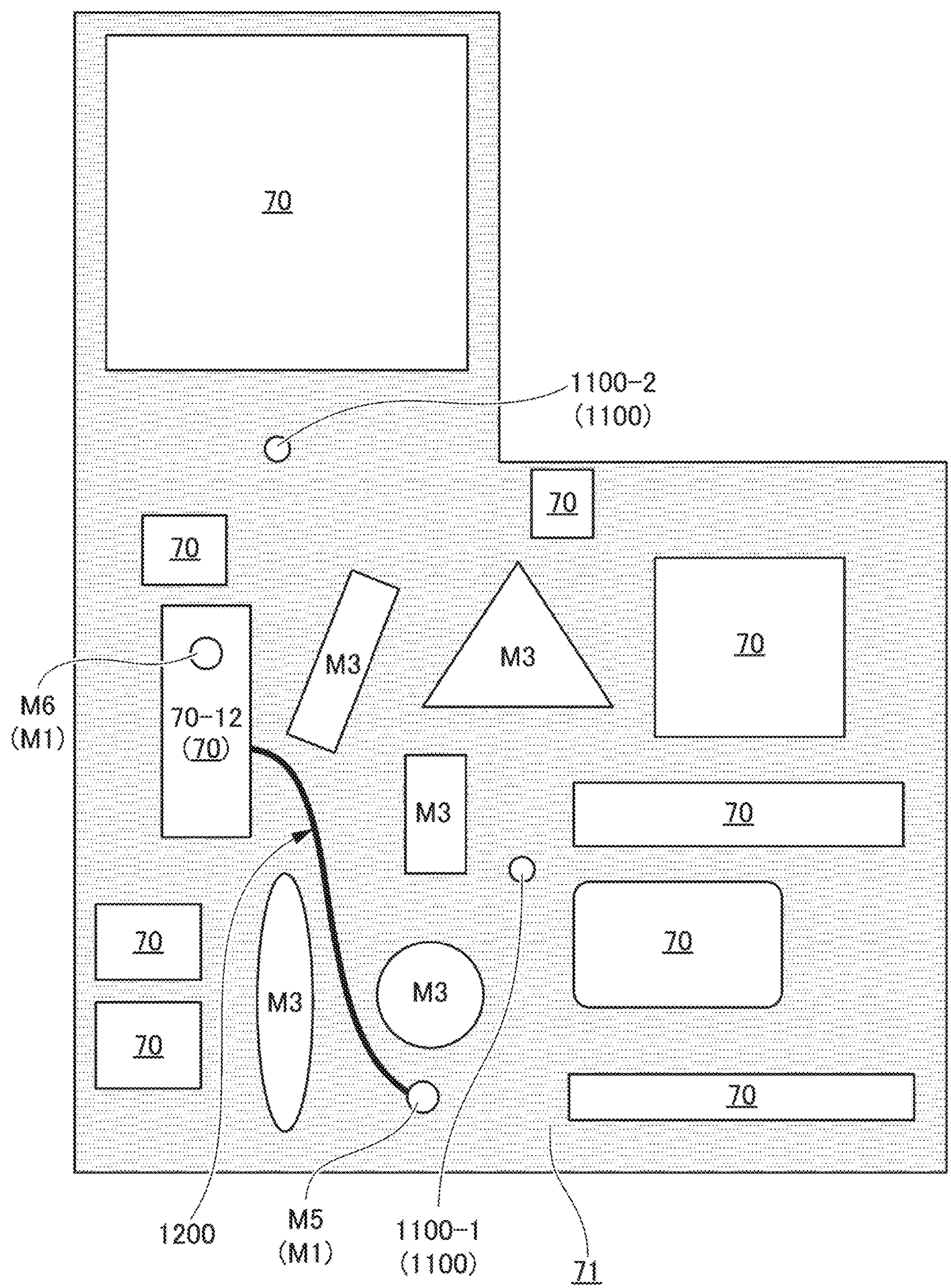
FIG. 12 is a drawing showing an example of a situation for explaining guidance information.

FIG. 12 is an explanatory view of guidance information, and is a plan view of a virtual space similar to FIG. 2. In the virtual space shown in FIG. 2, an example of the positional relationship between the preceding user avatar M6 and the guidance target user avatar M5 is shown. In the example shown in FIG. 12, the preceding user avatar M6 is located in a space portion 70-12, and the guidance target user avatar M5 is located in the free space portion 71 different from the space portion 70-12. For example, the position of the guidance target user avatar M5 shown in FIG. 12 may correspond to the initial position when entering the virtual space or its vicinity. In this case, the line or curve relating to the guidance information may be generated along a guidance route 1200 schematically shown in FIG. 12.

Figure 13:
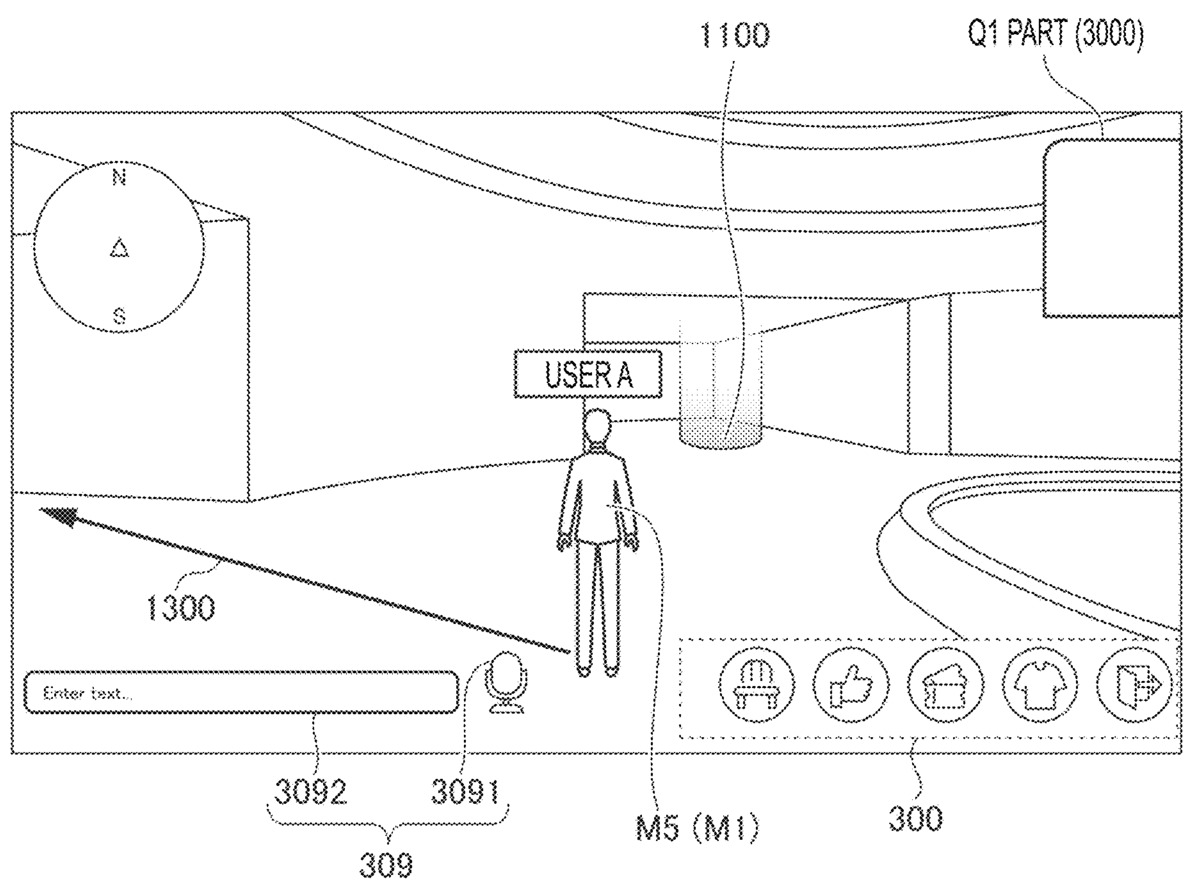
FIG. 13 is an explanatory view of an example of guidance information in the situation shown in FIG. 12.

FIG. 13 is a diagram showing an example of a terminal image for a user related to the guidance target user avatar M5 under the situation shown in FIG. 12. In FIG. 13, an arrow 1300 is drawn in association with the guidance target user avatar M5 as guidance information. In this case, the guidance information drawing portion 1583 calculates a guidance route (the guidance route 1200 in the example shown in FIG. 12) which is a recommended route for moving to the side of each other based on the positional relationship between the guidance target user avatar M5 and the preceding user avatar M6. At this time, as described above, the guidance information drawing portion 1583 may calculate a guidance route (that is, a guidance route along which the user avatar M1 can move) that does not pass through an object related to an obstacle such as a fountain object or the like. Then, the guidance information drawing portion 1583 draws the arrow 1300 as shown in FIG. 13 based on the calculated guidance route. As a result, the user related to the guidance target user avatar M5 can easily understand that the avatar may move along the arrow 1300.

Figure 14:
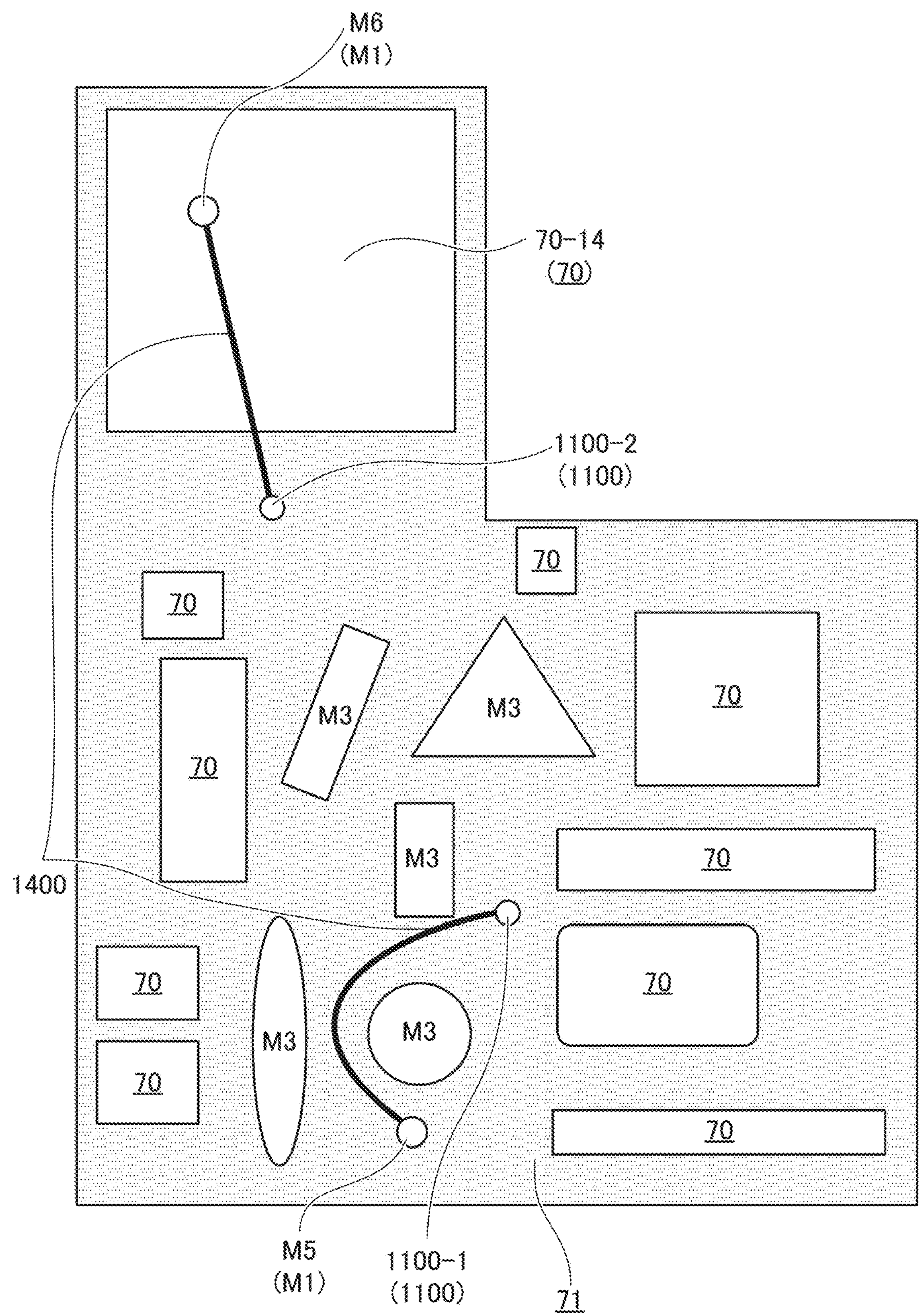
FIG. 14 is a drawing showing another example of a situation for explaining guidance information.

FIG. 14 is an explanatory view of guidance information, is a plan view of a virtual space similar to that of FIG. 2, and shows a situation different from that of FIG. 12. Also in FIG. 14, another example of the positional relationship between the preceding user avatar M6 and the guidance target user avatar M5 in the virtual space shown in FIG. 2 is shown. In the example shown in FIG. 14, the preceding user avatar M6 is located in a space portion 70-14, and the guidance target user avatar M5 is located in the free space portion 71 different from the space portion 70-14. In this case, the line or curve relating to the guidance information is a guidance route 1400 schematically shown in FIG. 14, and may be generated along the guidance route 1400 via the warp region 1100 as shown in FIG. 14.

Figure 15:
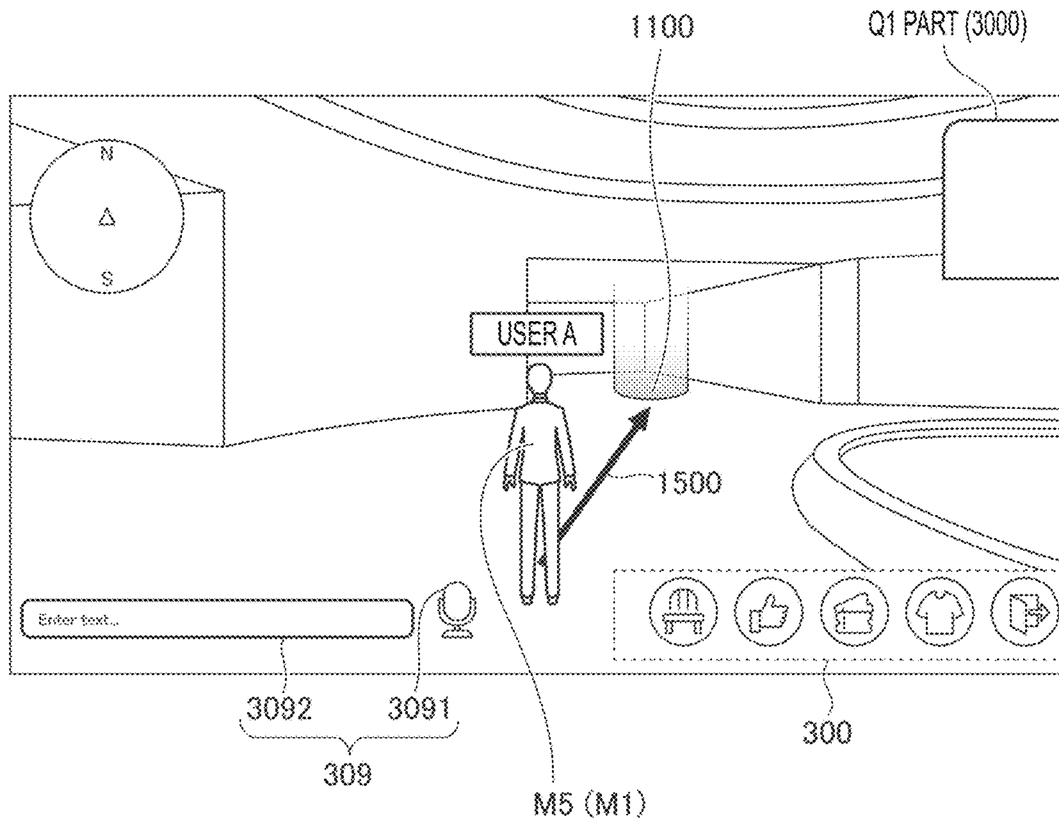
FIG. 15 is an explanatory view of an example of guidance information in the situation shown in FIG. 14.

FIG. 15 is a diagram showing an example of a terminal image for a user related to the guidance target user avatar M5 under the situation shown in FIG. 14. In FIG. 15, an arrow 1500 is drawn in association with the guidance target user avatar M5 as guidance information. In this case, the guidance information drawing portion 1583 calculates a guidance route (guidance route 1400 in the example shown in FIG. 14) which is a recommended route for moving to the side of each other based on the positional relationship between the guidance target user avatar M5 and the preceding user avatar M6, and draws the arrow 1500 as shown in FIG. 15 based on the calculated guidance route. In this case, if the guidance target user avatar M5 can move to the side of the preceding user avatar M6 in a shorter time when the guidance target user avatar M5 moves through the warp region 1100, the guidance route may include the warp region 1100. In such a case, typically the warp region 1100 is set between the guidance target user avatar M5 and the preceding user avatar M6. In this way, when the guidance route includes the warp region 1100, the guidance information drawing portion 1583 may draw a line or a curve with the warp region 1100 as an end point. In this case, the arrow 1500 can suggest that the avatar should go toward the warp region 1100. Through this, the user related to the guidance target user avatar M5 can easily understand that the avatar may move along the arrow 1500 through the warp region 1100.

Figure 16:
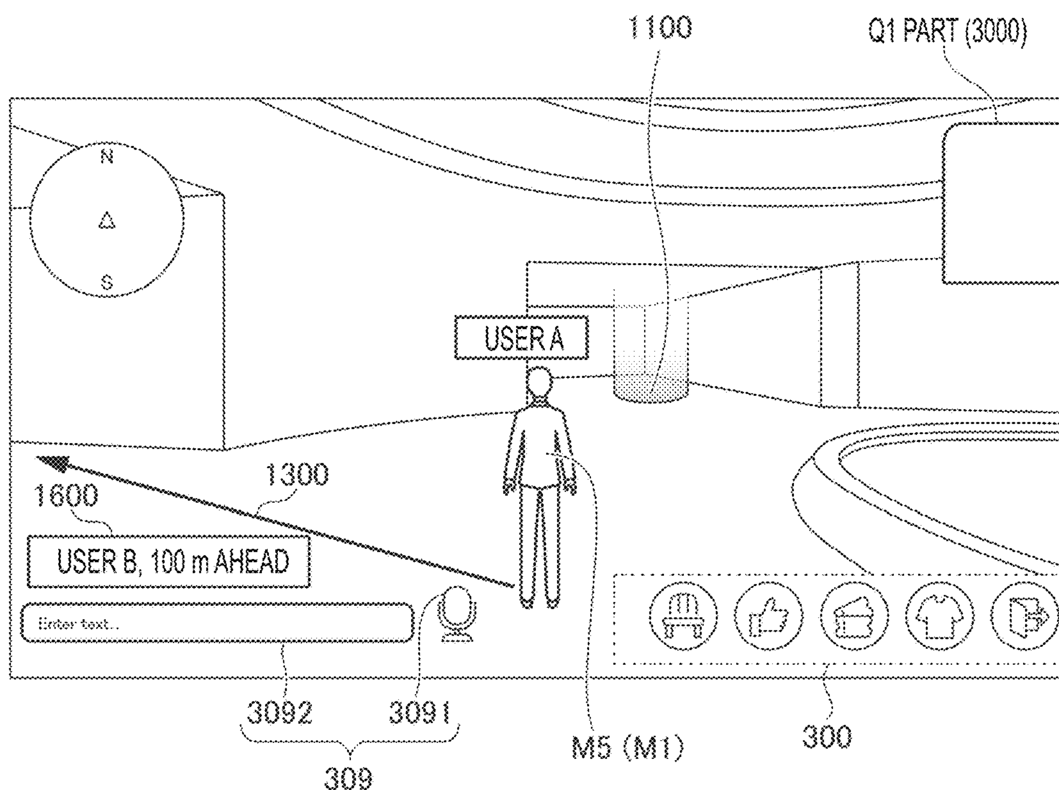
FIG. 16 is an explanatory view of another example of guidance information in the situation shown in FIG. 12.

FIG. 16 is an explanatory view of guidance information according to another example, and is a diagram showing an example of a terminal image for a user related to the guidance target user avatar M5 under the situation shown in FIG. 12. As described above, the guidance information may include supplementary guidance information in addition to the lines or curves described above. Supplementary guidance information may be information that cannot be represented by a line or a curve, information that is more detailed than a line or a curve, or the like. For example, in the example shown in FIG. 16, supplementary guidance information 1600 is in the form of character information and is drawn in association with the arrow 1300. In this case, the user related to the guidance target user avatar M5 can easily understand that the preceding user avatar M6 having the user name "User B" is 100 m ahead by looking at the supplementary guidance information 1600. Such supplementary guidance information is suitable in a situation where there is a plurality of preceding user avatars M6 as described below with reference to FIG. 17.

Figure 17:
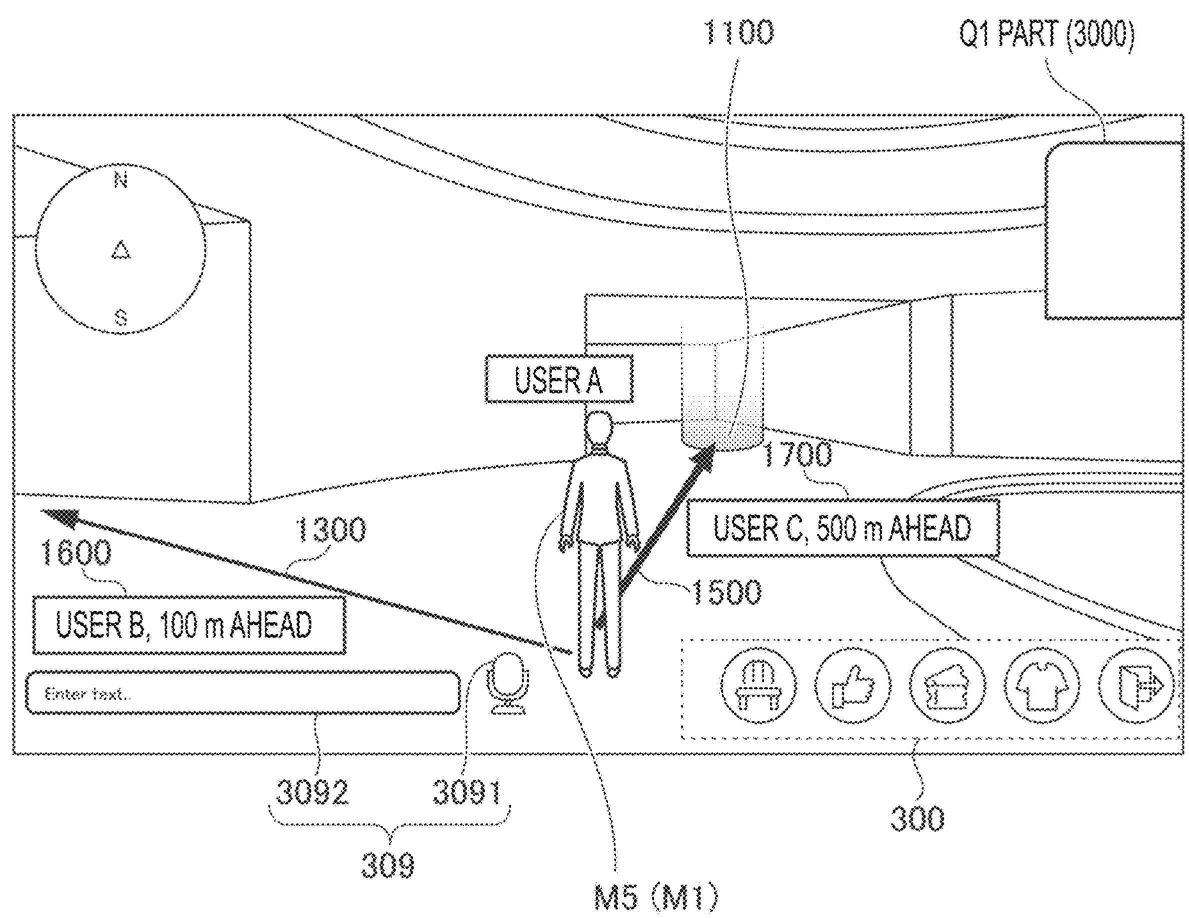
FIG. 17 is an explanatory view of an example of guidance information in a situation in which leading user avatars of two people are placed in a virtual space.

FIG. 17 is an explanatory view of guidance information according to another example, and is a diagram showing an example of a terminal image for a user related to the guidance target user avatar M5 under a situation where two preceding user avatars M6 are located in a virtual space (a situation where the preceding user avatar M6 shown in FIG. 12 and the preceding user avatar M6 shown in FIG. 14 are simultaneously present).

In a situation where a plurality of preceding user avatars M6 is located in the virtual space, the guidance information drawing portion 1583 may draw guidance information for each of the plurality of preceding user avatars M6. That is, the guidance information drawing portion 1583 may draw the guidance information in association with each of the plurality of preceding user avatars M6. In the example shown in FIG. 17, the arrow 1300 related to the preceding user avatar M6 shown in FIG. 12 and the arrow 1500 related to the preceding user avatar M6 shown in FIG. 14 are drawn at the same time. In this case, the supplementary guidance information 1600 relating to the preceding user avatar M6 of the user name "User B" shown in FIG. 12 and the supplementary guidance information 1700 relating to the preceding user avatar M6 of the user name "User C" shown in FIG. 14 may be shown.

As described above, even in a situation where a plurality of preceding user avatars M6 is located in the virtual space, if some or all of the plurality of preceding user avatars M6 are substantially at the same position, the lines or curves relating to guidance information relating to one or more preceding user avatars M6 substantially at the same position may be integrated.

As described above, according to this embodiment, by drawing the guidance information as described above, it becomes possible to appropriately assist the movement of the guidance target user avatar M5 (that is, the movement operation input by the user related to the guidance target user avatar M5) in the virtual space.

In this embodiment, the guidance information may be output when a predetermined output condition is satisfied. In this case, the predetermined output condition may be determined for each friend avatar that can be the preceding user avatar M6, as in the above-described predetermined warp condition. The predetermined output condition may be the same as the above-described predetermined warp condition. In this case, the friend avatar drawn in association with the warp button 1800 is also simultaneously drawn with guidance information as the preceding user avatar M6.

When the warp input is invalidated by the below-described invalidation processor 1662, the auxiliary information drawing portion 1584 draws auxiliary information for canceling the invalidation. As described below, the movement of the user avatar M1 to the content provision position may be restricted depending on the possession state of a ticket related to the user avatar M1. Specifically, if one user does not have a valid ticket for one content provision position, the warp input by the one user (warp input for instantaneous movement to the space portion related to the one content provision position) is invalidated by the invalidation processor 1662. The auxiliary information drawing portion 1584 provides auxiliary information that enables warp input in such a case.

The auxiliary information provided by the auxiliary information drawing portion 1584 may include at least one item among the following: information on a ticket acquisition method, information on a position in the virtual space where the ticket can be acquired, information on a link or access method to a specific screen where the ticket can be acquired, privilege information when a ticket has been acquired, and information about content that can be viewed when a ticket has been acquired.

In this embodiment, the auxiliary information drawing portion 1584 draws auxiliary information in association with the warp button 1800 drawn in an inoperable mode. As described above, the warp button 1800 is drawn in an inoperable mode when a predetermined warp condition is not satisfied. Since the auxiliary information includes information for satisfying the predetermined warp condition, a user who wants to operate the warp button 1800 can understand the various operation procedures and contents for satisfying the predetermined warp condition by accessing the auxiliary information.

Figure 18:
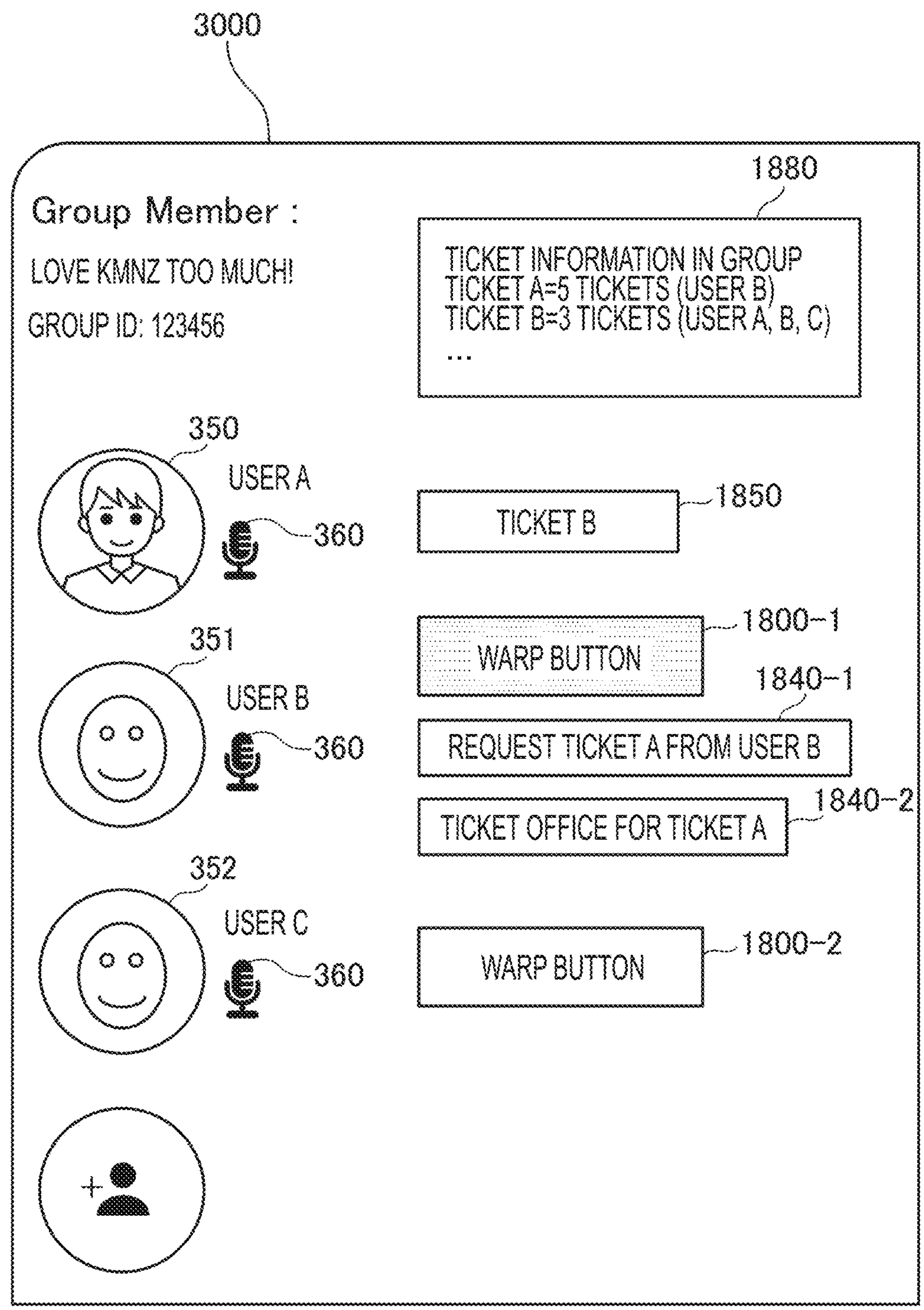
FIG. 18 is an explanatory view of an example of auxiliary information.

For example, FIG. 18 shows a group information display region 3000 on a terminal screen for a user related to the user name "User A". In this example, a warp button 1800-2 is drawn in an operable mode for the user name "User C", whereas the warp button 1800-1 is drawn in an inoperable mode for the user name "User B". In this case, the user name "User B" is located in a space portion that requires the ticket A, but the user (principal) related to the user name "User A" does not have the ticket A and the predetermined warp condition is not satisfied. In this case, the user related to the user name "User A" can understand that it is necessary to acquire the ticket A when wanting to instantaneously move one's own user avatar M1 (guidance target user avatar M5) to the side of the user avatar M1 (preceding user avatar M6) of the user name "User B" based on the auxiliary information 1840-1 and 1840-2 and the point that the warp button 1800-1 is inoperable.

In the example shown in FIG. 18, the ticket status 1880 in the group is drawn in the group information display region 3000. The ticket status 1880 in the group may include information about the ticket(s) possessed by each user avatar M1 (friend avatar) in the group. In this case, the user avatar M1 pertaining to the user name "user B" possesses five tickets A. Therefore, when the user related to the user name "User A" wants to move their own user avatar M1 (guidance target user avatar M5) to the side of the user avatar M1 (preceding user avatar M6) of the user name "User B", it is possible to request the ticket A from the user with the user name "User B" for example by operating a link or button (not shown) related to the auxiliary information 1840-1.

Figure 19:
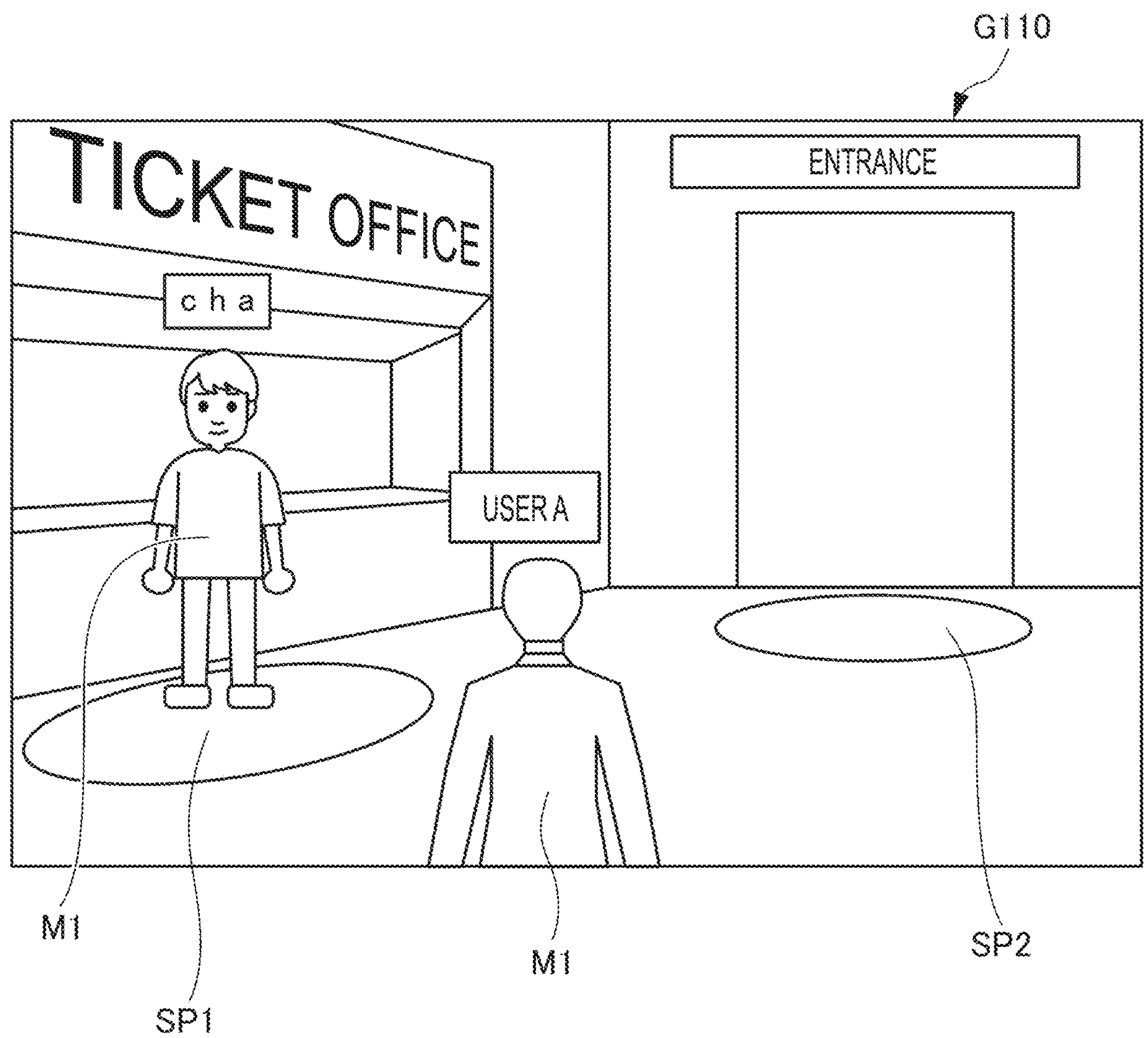
FIG. 19 is an explanatory view of guidance of auxiliary information to a ticket office.

FIG. 19 shows an image G110 for a terminal including a ticket office in a virtual space. The user related to the user name "User A" may be able to instantaneously move to the ticket office by operating the link or button (not shown) related to the auxiliary information 1840-2 (see FIG. 18), for example. In the example shown in FIG. 19, the terminal image G110 for the user related to the user name "User A" is shown, being the terminal image after the instantaneous movement to the ticket office. The ticket office may be arranged in the vicinity of the space portion where the content related to the ticket A sold at the ticket office is provided. For example, in the example shown in FIG. 19, the user related to the user name "User A" may move the corresponding user avatar M1 to a ticket purchase position SP1 and, for example, may purchase the ticket A from the user avatar M1 (user name "cha") related to the staff working at the ticket office. Then, after purchasing the ticket A, the user related to the user name "User A" can enter the space portion for providing the content related to the purchased ticket A by moving the corresponding user avatar M1 to an entrance position SP2.

The warp action drawing portion 1585 may perform an effect suggesting instantaneous movement (for example, an effect by animation) when the first warp process by the first warp processor 15222 and the second warp process by the second warp processor 15223 are executed. The effect suggesting instantaneous movement may be realized by, for example, a high-speed vehicle (high-speed train, helicopter, or the like), a change of the entire screen to a specific color, a flash effect, or the like. The effect on the first warp process and the effect on the second warp process may be realized in different modes. Further, the effect mode may be different depending on the length of the movement distance by the warp process.

Further, the instantaneous movement related to the warp process may be realized by automatically moving the user avatar M1 (guidance target user avatar M5) at high speed along the movement trajectory of the preceding user avatar M6. In this case, the terminal image undergoing the warp process may be drawn by partially omitting the drawing of peripheral second objects M2 or the like. Through this, it is possible to show to the guidance target user avatar M5 the same scenery (scenery in the virtual space) as the user related to the preceding user avatar M6 while reducing the processing load related to the drawing process related to the warp processing. As a result, for example, even when the guidance target user avatar M5 instantaneously moves to the side of the preceding user avatar M6, it is possible to enjoy dialog on a topic such as a second object M2 on the way, and it is possible to promote dialog.

The space portion transition drawing portion 1586 may perform an effect suggesting a transition of space portions when one user avatar M1 moves from one space portion to another space portion based on the movement operation input. The effect suggesting the transition of space portions may be realized, for example, by temporarily expanding the space portion after the movement.

The content processor 159 provides content to the user at each content provision position. The content processor 159 may output content on the terminal device 20 via a browser, for example. Alternatively, the content processor 159 may output the content on the terminal device 20 via the virtual reality application installed in the terminal device 20.

The dialog processor 160 executes dialog processing related to dialog among users via the network 3 based on inputs from a plurality of users. Dialog among users may be realized in text and/or voice chat format via the users' respective user avatars M1. For example, the dialog interface 309 of the terminal image shown in FIG. 3 may be used for the dialog input. In this case, the user can input voice by operating an icon 3091 of the microphone and speaking, and can input text by inputting text in a text input region 3092. This enables dialog among users. The text may be drawn on each terminal image (each terminal image related to each user interacting with each other) in a dialog format in which a certain number of histories remain. In this case, for example, the text may be output separately from the image related to the virtual space, or may be output superimposed on the image related to the virtual space.

The dialog processor 160 may execute dialog processing for each group so that dialog is realized only within the same group. In this case, each user can enjoy the dialog with peace of mind because the content of what is said is not known to users outside the group. In this case, when a voice input from one user in the group is output, the dialog processor 160 may emphasize (for example, enlargement, blinking, coloring, or the like) a microphone icon 360 corresponding to that user out of the microphone icons 360 that may be displayed within the group information display region 3000 (see FIG. 3A). As a result, other users can easily grasp which user's voice in the group is the voice being output. In place of or in addition to the microphone icon 360, avatar icons (avatar icons 350 and 351 and the like) in the group information display region 3000 (see FIG. 3A) may be similarly emphasized.

The first movement authority processor 162 generates a ticket (movement authority) for receiving the provision of content at the content provision position based on a purchase input from the user and associates that ticket with the user avatar M1 associated with the user.

Purchase input includes various inputs for purchasing tickets. Purchase input typically involves consumption of money or virtual reality media having a monetary value. The virtual reality media having a monetary value may include virtual reality media or the like that can be obtained with the consumption of money. Consumption of the virtual reality media may be realized by eliminating the association between the user ID and the virtual reality media, reducing the amount and number of the virtual reality media associated with the user ID, or the like.

The first movement authority processor 162 newly generates a ticket ID (see FIG. 9) when generating a ticket and updates the data in the ticket information memory 145. In this case, the content provision position, the owner ID and the like are associated with the new ticket ID (see FIG. 9). In this case, the owner ID is the user ID related to the user who has performed the above-described purchase input.

In this embodiment, as an example, the first movement authority processor 162 includes a purchase input acquisition portion 1621, a ticket ID generator 1622, an authentication information notification portion 1623, and a ticket drawing portion 1624.

The purchase input acquisition portion 1621 acquires the purchase input from the above-described user from the terminal device 20 via the network 3.

When a user avatar M1 is located near the entrance related to the content provision position, the purchase input can be input by the user associated with that user avatar M1. The entrance related to the content provision position in the virtual space does not need to be clearly defined, but characters such as an entrance or a gate may be associated with the position corresponding to the entrance in the virtual space by drawing.

In this case, the user who wants to purchase a ticket brings their own user avatar M1 to the vicinity of the entrance, and can perform the purchase input through dialog with the user avatar M1 (see the user avatar M1 of the user name "cha" in FIG. 19) related to the staff arranged in association with the ticket purchase position SP1.

As described above, the ticket ID generator 1622 newly generates a ticket ID (see FIG. 9) based on the purchase input and updates the data in the ticket information memory 145. For example, when a user who wants to purchase a ticket makes a purchase input with their own user avatar M1 positioned near the entrance, the ticket ID generator 1622 immediately generates a new ticket ID. In this case, the initial value of the validity flag associated with the ticket ID may be set to "1". Further, when a user who has purchased a ticket in advance makes an activation input with their own user avatar M1 located near the entrance, the ticket ID generator 1622 may change the value of the validity flag associated with the already generated ticket ID from "0" to "1".

The authentication information notification portion 1623 communicates the authentication information for transfer (see FIG. 9) associated with the purchased ticket to the user who purchased the ticket based on the purchase input. As described above, in this embodiment, as an example the authentication information for transfer is a 4-digit code consisting of numbers and/or symbols. For example, the authentication information notification portion 1623 transmits the authentication information for transfer to the terminal device 20 related to the user who purchased the ticket via the network 3. At this time, the authentication information for transfer may be communicated by email, automated voice by telephone, or the like. Alternatively, as described above, the transfer authentication information may be set by the user when the purchase input is performed. In this case, the authentication information notification portion 1623 may be omitted.

The ticket drawing portion 1624 may draw a ticket (virtual reality medium) for each ticket ID based on the purchase input. For example, the ticket drawing portion 1624 may draw a ticket in association with the ticket display 1850 (see FIG. 3A) when the icon display of the user avatar M1 related to the owner ID is included. Alternatively, the ticket drawing portion 1624 may draw a ticket in association with the hand of the user avatar M1 related to the owner ID in the terminal image including the user avatar M1 related to the owner ID. As a result, a state in which the user avatar M1 possesses (owns) the ticket can be realized in virtual reality. When a plurality of ticket IDs is associated with the same owner ID, the user avatar M1 related to the owner ID may be drawn in a manner of possessing a plurality of tickets.

Based on a transfer input from the user, the second movement authority processor 164 changes the association of a ticket associated with the user ID related to a specific user by the first movement authority processor 162 to the user ID related to a user different from that user. That is, the second movement authority processor 164 changes the owner ID (see FIG. 9) associated with that ticket from the user ID related to the purchaser ID to the user ID related to another transferee user. In this way, based on the transfer input, the second movement authority processor 164 changes the association of a ticket associated with a specific user (purchaser ID) by the first movement authority processor 162 to a user (transferee user) different from that user. As a result, the ticket changes from a state associated with the user avatar M1 related to the transferring-side user to a state associated with the user avatar M1 related to the receiving-side side user, based on the transfer input.

Specifically, the second movement authority processor 164 includes a transfer input acquisition portion 1640, an authentication notification guidance portion 1641, and a ticket information rewriting portion 1644.

The transfer input acquisition portion 1640 acquires the transfer input from the above-described transferring-side user from the terminal device 20 via the network 3. The transfer input includes the ticket ID related to the ticket to be transferred. The user who can input the transfer is the user who owns the ticket and is the user who has the user ID related to the owner ID in the ticket information 900 (see FIG. 9). Further, the transfer input may include the user ID associated with the receiving-side user.

The transfer input may be inputtable by the user together with the purchase input, for example. This is because, for example, when a parent and child purchase a ticket, the parent often purchases the ticket with the intention of transferring it to the child. Alternatively, a user to which a plurality of tickets is associated (that is, a user who has purchased a plurality of tickets) can also perform a transfer input in response to a request from another user.

The authentication notification guidance portion 1641 responds to the above-described transfer input and guides the transferring-side user to notify the receiving-side user of the transfer authentication information. It should be noted that this guidance may be realized at the time of purchase input or may be realized at another timing. Further, if this point is communicated in advance to each user when using the virtual reality generation system 1, the authentication notification guidance portion 1641 may be omitted. Upon receiving such guidance, the transferring-side user notifies the receiving-side user of the transfer authentication information by chat, email, SMS (Short Message Service), or the like. If the transferring-side user and the receiving-side user have a relationship in which the same transfer authentication information is used many times, such as a parent-child relationship, notification of the transfer authentication information itself may not be needed. Further, when the transferring-side user and the receiving-side user are close to each other in reality, notification of the transfer authentication information may be directly realized face-to-face.

The ticket information rewriting portion 1644 rewrites the owner ID of the ticket information 900 based on the transfer input acquired by the transfer input acquisition portion 1640 and the input of the transfer authentication information from the receiving-side user. Specifically, when the authentication is successful based on the input of legitimate transfer authentication information from the receiving-side user, the ticket information rewriting portion 1644 associates the user ID included in the transfer input as the owner ID associated with the ticket ID included in the transfer input. At this time, the user ID related to the user who performed the transfer input is eliminated from the state associated with the owner ID, and the fact of that transfer may be added as the transfer information (see FIG. 9) of the ticket information rewriting portion 1644. Alternatively, instead of rewriting the owner ID of the ticket information 900 (for example, while a state in which the user ID related to the user who performed the transfer input is associated with the owner ID is maintained), the user ID related to the receiving-side user may be registered as the user or user avatar M1 who can use that ticket.

Here, as described above, the transfer authentication information is communicated in advance from the transferring-side user to the receiving-side user. The transferring-side user can set transfer authentication information that only the receiving-side user can understand or can communicate the transfer authentication information so that only the receiving-side user can understand such, so there is virtually no possibility that the transfer authentication information will be understood by an unintended other user. Therefore, by using such transfer authentication information, the security of the authentication related to the ticket information rewriting portion 1644 can be enhanced. However, from the viewpoint of enabling a simple transfer, comparison by the transfer authentication information at the time of transfer may be omitted. Whether or not to omit the transfer authentication information may be selectable at the time of transfer input.

When the owner ID related to one ticket ID is changed in this way, the ticket information rewriting portion 1644 may give an instruction to reflect the change to the ticket drawing portion 1624. In this case, the ticket drawing portion 1624 draws a ticket in association with the user avatar M1 related to the new owner ID. For example, the user can recognize whether or not the ticket is possessed by confirming the transition to the ticket management screen, or the ticket display 1850 (see FIG. 3A and FIG. 18) displayed in the group information display region 3000, or the state in which the ticket is drawn in association with the user avatar M1 of the user, in the user terminal image displayed on the terminal device 20 of the user.

The determination processor 166 determines whether or not the user avatar M1 can move to the content provision position based on the ticket information 900 (see FIG. 9).

Specifically, the determination processor 166 includes a ticket possession determination portion 1661 (an example of the first determination portion) and an invalidation processor 1662.

When determining whether or not one user avatar M1 can move to one content provision position, the ticket possession determination portion 1661 first determines whether or not the one user avatar M1 possesses a ticket that can move to the one content provision position. Hereinafter, such a determination process is also referred to as "ticket possession determination".

The ticket possession determination can be realized based on the ticket information 900 shown in FIG. 9. In this case, it can be determined that the user (or user avatar M1 thereof) whose user ID is the owner ID possesses a ticket with a ticket ID associated with that owner ID. Further, when the validity flag "1" is associated with the ticket ID of the ticket, it can be determined that the ticket is a ticket that can move to the content provision position.

The ticket possession determination may be executed with arbitrary timing, and may be executed, for example, in a state where the above-described warp button 1800 (see FIG. 3A) appears. Alternatively, the ticket possession determination may be executed for the user avatar M1 located at the entrance region related to the content provision position based on the position information of the user avatar M1 (see FIG. 6). The entrance region related to the content provision position (for example, the entrance position SP2 in FIG. 19) is a region where the user avatar M1 who wants to move to the content provision position is located, and positioning the user avatar M1 in the entrance region may be a display of the intention of the user who wants to move the user avatar M1 to the content provision position. Alternatively, in addition to the user avatar M1 being located in the entrance region, a ticket presentation operation or the like may be treated as a display of the intention of the user who wants to move the user avatar M1 to the content provision position.

Here, in this embodiment, the ticket can be transferred as described above in relation to the second movement authority processor 164. Therefore, at the time of a ticket possession determination relating to the space portion that is one content provision position, there are cases in which the ticket possession determination portion 1661 determines that a user avatar M1 relating to a user who has not initially purchased the ticket relating to the one content provision position can move to the one content provision position. Specifically, when one user avatar M1 is associated with acquisition information of a plurality of tickets related to one content provision position, and another user avatar M1 satisfies a predetermined condition, the ticket possession determination portion 1661 determines that the other user avatar M1 can be moved to the space portion related to the one content provision position. For example, in the example shown in FIG. 18, the user avatar M1 related to the user name "User B" is associated with the acquisition information of five tickets A, and in this case, when a ticket A has been legitimately transferred to the user related to the user name "User A" from the user related to the user name "User B" (an example of a predetermined condition), the user avatar M1 of the user related to the user name "User A" can move to the content provision position of the ticket A.

When it is determined by the ticket possession determination portion 1661 that one user avatar M1 has a ticket that move to the content provision position, the invalidation processor 1662 allows the one user avatar M1 to move to the content provision position. On the other hand, when it is determined by the ticket possession determination portion 1661 that the one user avatar M1 does not have a ticket that can move to the content provision position, the invalidation processor 1662 prohibits the one user avatar M1 from moving to the content provision position. In this case, in this embodiment, the invalidation processor 1662 prohibits the one user avatar M1 from moving to the content provision position by invalidating the warp button 1800 (warp input for moving to the content provision position) associated with the one user avatar M1. For example, the invalidation processor 1662 outputs an invalidation instruction of the warp button 1800 to the user interface drawing portion 1582. In this case, the user interface drawing portion 1582 realizes invalidation by not displaying the warp button 1800 associated with one user avatar M1 or by displaying such in an inactive state (see the warp button 1800-1 in FIG. 18). Although the very existence of the warp button 1800-1 in the inactive state is visible, no warp input is generated even if an attempt is made to operate the warp button 1800-1.

Alternatively, instead of the invalidation instruction of the warp button 1800, the invalidation processor 1662 may change the second predetermined position, which is the destination of the second warp processing related to the warp button 1800, from a position in the space portion where the content provision position is located, to a position outside the space portion (for example, near the entrance).

The parameter update portion 170 updates each value of various parameters (see FIG. 4) of the virtual camera 60. As described above, the values of the various parameters of the virtual camera 60 may differ for each terminal image (for each user avatar M1). The parameter update portion 170 may update each value of the various parameters of the virtual camera 60 related to the one user avatar M1 according to the position/orientation information of the one user avatar M1. Further, the parameter update portion 170 may update each value of the various parameters of the virtual camera 60 according to a mode change such as the first-person viewpoint mode of the terminal image generator 158 described above.

Next, an operation example of the virtual reality generation system 1 will be described with reference to FIG. 20 to FIG. 23 and the like. In the subsequent process flow diagram (flowchart), the processing order of each step may be changed as long as the relationship between the input and the output of each step is not impaired.

Figure 20:
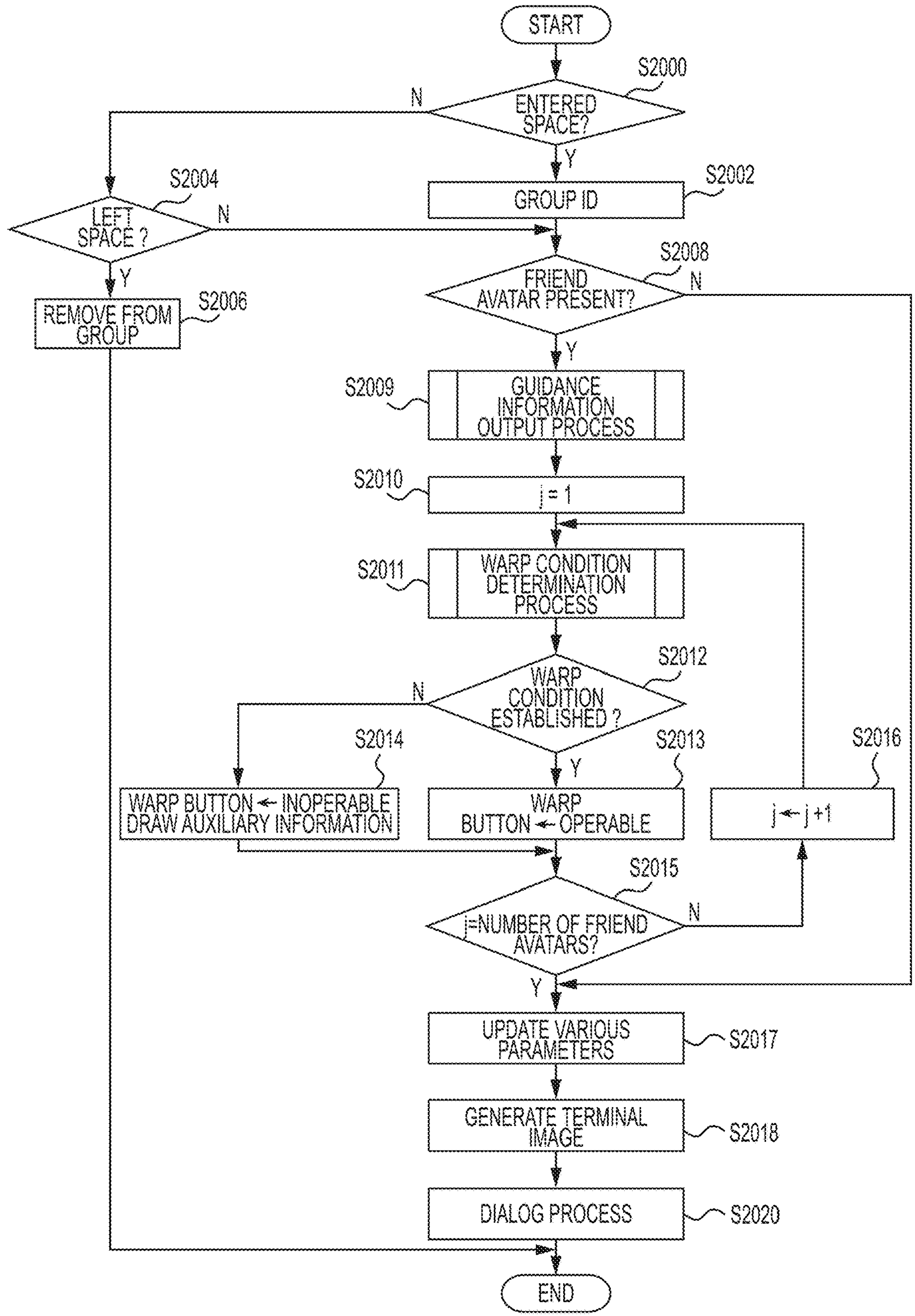
FIG. 20 is a schematic flowchart showing an example of operations related to drawing of guidance information and drawing of a warp button, among various types of operations of a virtual reality generation system.

FIG. 20 is a schematic flowchart showing an example of operations related to drawing of guidance information and drawing of the warp button 1800, among various operations of the virtual reality generation system 1. The process shown in FIG. 20 shows a process for a certain user, is started when the virtual reality application in the terminal device 20 related to one user is started, and may be executed repeatedly at predetermined intervals until the virtual reality application is turned off. The process shown in FIG. 20 may be executed in parallel for each user.

In step S2000, the server device 10 determines whether or not the user avatar M1 related to one user has entered the virtual space. That is, it is determined whether or not there has been entry into the virtual space. If the determination result is "YES", the process proceeds to step S2002, and otherwise, the process proceeds to step S2004. In the following, unless otherwise specified, the user refers to the user related to the user avatar M1 determined to have entered the virtual space in step S2000, and the user avatar M1 refers to the user avatar M1 that is determined to have entered the virtual space in step S2000.

In step S2002, the server device 10 assigns a group ID to the user avatar M1. The user may input the group name when entering the virtual space. In this case, inputting of the group name may be realized by selecting a desired group name from the list of currently operating group names. In this case, the server device 10 updates the group status information 1000 (see FIG. 10) in the group status memory 146 by associating the user avatar M1 with the group ID corresponding to the group name. If a new group name is input, a new group ID may be set.

In step S2004, the server device 10 determines whether or not the user avatar M1 has left the virtual space. If the determination result is "YES", the process proceeds to step S2006, and otherwise (that is, if the user avatar M1 is still active in the virtual space), the process proceeds to step S2008.

In step S2006, the server device 10 updates the group status information 1000 (see FIG. 10) in the group status memory 146 by removing (deleting) the user avatar M1 from the group. The exit of the user avatar M1 may be communicated to the users related to other user avatars M1 in the group. For example, the exit of the user avatar M1 may be communicated to users related to other user avatars M1 in the group by updating the information in the group information display region 3000.

In step S2008, the server device 10 determines whether or not another user avatar M1 (that is, a friend avatar) in the same group exists based on the group status information 1000 in the group status memory 146. If the determination result is "YES", the process proceeds to step S2009, and otherwise, the process proceeds to step S2017.

In step S2009, the server device 10 executes a guidance information output process. An example of the guidance information output process will be described later with reference to FIG. 21.

In step S2010, the server device 10 sorts the user IDs of one or more other user avatars M1 (friend avatars) in the group in a predetermined order, and sets the variable j to the initial value "1".

In step S2011, the server device 10 performs a warp condition determination process for the j-th friend avatar. An example of the warp condition determination process will be described later with reference to FIG. 22.

In step S2012, the server device 10 determines whether or not the predetermined warp condition is satisfied for the user avatar M1 to instantaneously move to the side of the j-th friend avatar based on the result of the warp condition determination process in step S2011. If the determination result is "YES", the process proceeds to step S2013, and otherwise, the process proceeds to step S2014.

In step S2013, the server device 10 draws the warp button 1800 so as to be operable, in association with the friend avatar that satisfies the predetermined warp condition.

In step S2014, the server device 10 draws the warp button 1800 so as to be inoperable, in association with the friend avatar that does not satisfy the predetermined warp condition, and also draws the above-described auxiliary information. As a result, the user can satisfy a predetermined warp condition by appropriately acquiring a ticket by relying on the auxiliary information.

In step S2015, the server device 10 determines whether or not the variable j matches the number of friend avatars in the group. That is, it is determined whether or not the success or failure of the predetermined warp condition has been determined for all the friend avatars. If the determination result is "YES", the process proceeds to step S2017, and otherwise, the process returns to step S2011 via step S2016.

In step S2016, the server device 10 increments the variable j by "1". In this way, when a plurality of friend avatars exists in the virtual space, the warp condition determination process may be executed for each friend avatar.

In step S2017, the server device 10 updates the position/orientation information of each user avatar M1 and each value of each camera parameter of each virtual camera 60 based on various operation inputs from each user in the group.

In step S2018, the server device 10 generates a terminal image for each user in the group and transmits such to the terminal device 20 of each user.

In step S2020, the server device 10 executes a dialog process based on voice input from each user in the group. The dialog process may be as described above in relation to the dialog processor 160.

Figure 21:
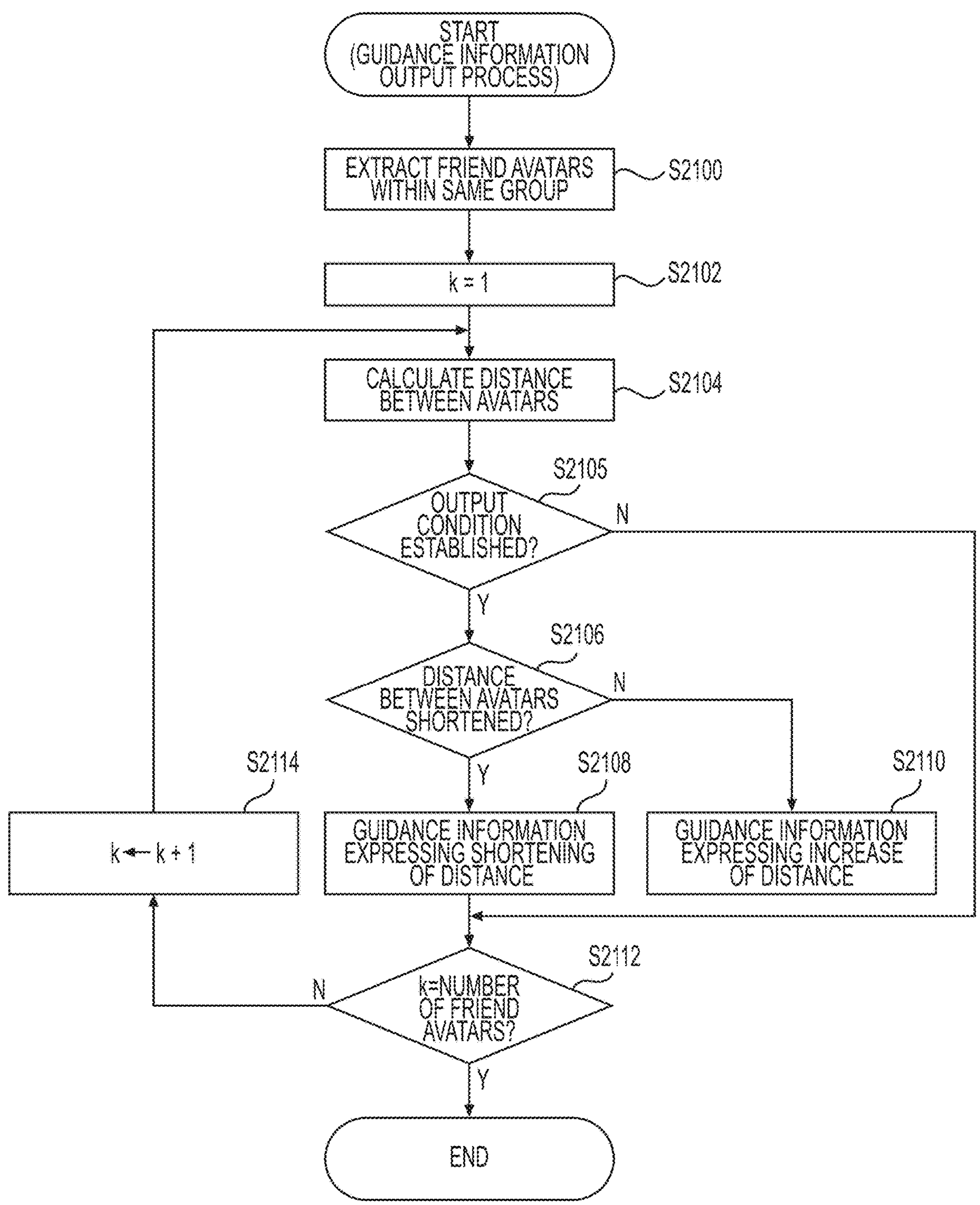
FIG. 21 is a schematic flowchart showing an example of a guidance information output process (step S2009 in FIG. 20).

FIG. 21 is a schematic flowchart showing an example of a guidance information output process (step S2009 in FIG. 20).

In step S2100, the server device 10 extracts one or more other user avatars M1 (friend avatars) in the group, and sorts the user IDs (or user avatar IDs) related to the extracted friend avatars into a predetermined order.

In step S2102, the server device 10 sets the variable k to the initial value "1".

In step S2104, the server device 10 targets the k-th friend avatar as a processing target, and calculates the distance d(i) of the current cycle, which is the distance between the user avatar M1 and the k-th friend avatar (denoted as "distance between avatars" in FIG. 21). Here, "i" is an arbitrary integer representing the number of cycles. The distance d(i) may be a distance in the global coordinate system as described above.

In step S2105, the server device 10 determines whether or not the predetermined output condition of the guidance information is satisfied for the k-th friend avatar. The predetermined output condition is arbitrary as described above, but here, for example, may be satisfied when the distance d(i) is a predetermined distance D4 or more. In this case, the predetermined distance D4 is significantly larger than the above-described predetermined distance D2, and may be the same as the above-described predetermined distance D3. If the determination result is "YES", the process proceeds to step S2106, and otherwise, the process proceeds to step S2112.

In step S2106, the server device 10 determines whether or not the distance between the user avatar M1 and the k-th friend avatar has shortened in this cycle compared to the prior cycle, based on the distance d(i) of the current cycle and the distance d(i−1) of the previous cycle. In a modified example, instead of the distance d(i−1) of the previous cycle, the average value of the distances in a predetermined number of cycles before the previous cycle may be used. If the determination result is "YES", the process proceeds to step S2108, and otherwise, the process proceeds to step S2110.

In step S2108, the server device 10 draws guidance information including distance change information (guidance information indicating distance shortening) indicating that the distance between the user avatar M1 and the k-th friend avatar has shortened, being guidance information indicating the positional relationship between the user avatar M1 and the k-th friend avatar. The method of drawing the guidance information may be as described above.

In step S2110, the server device 10 draws guidance information including distance change information (guidance information indicating distance increasing) indicating that the distance between the user avatar M1 and the k-th friend avatar has increased, being guidance information indicating the positional relationship between the user avatar M1 and the k-th friend avatar. The method of drawing the guidance information may be as described above.

In step S2112, the server device 10 determines whether or not the variable k matches the number of friend avatars in the group. That is, it is determined whether or not the guidance information has been drawn for all of the friend avatars. If the determination result is "YES", the process of FIG. 21 is terminated, and otherwise, the process returns to step S2104 via step S2114.

In step S2114, the server device 10 increments the variable k by "1". In this way, when a plurality of friend avatars exists in the virtual space, the distance change mode may be evaluated for each friend avatar.

In this way, through the processes shown in FIG. 20 and FIG. 21, guidance information and warp buttons 1800 can be drawn for each friend avatar in the group, and the movement of the user avatar M1 in the virtual space can be effectively supported.

Figure 22:
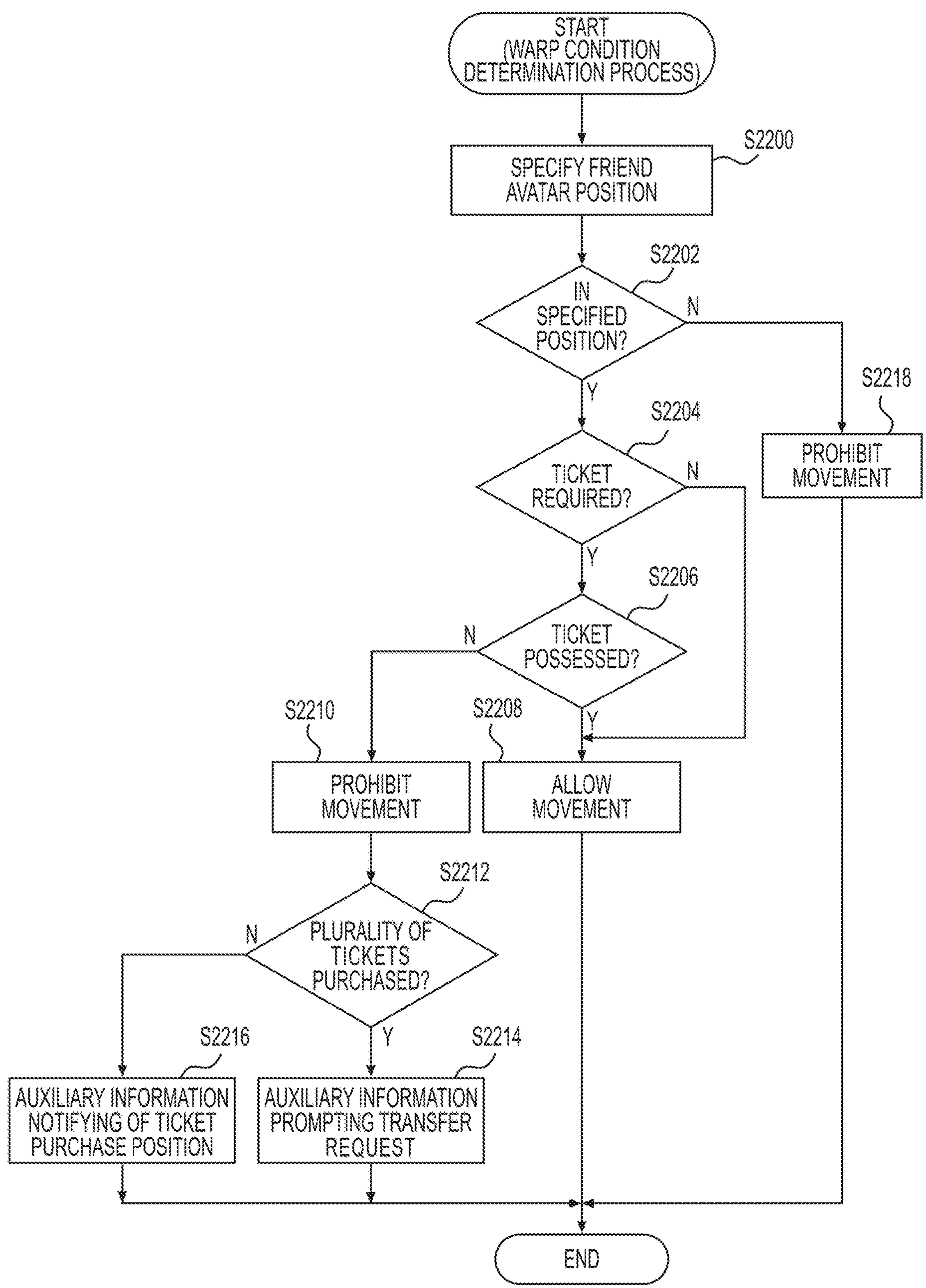
FIG. 22 is a schematic flowchart showing an example of a warp condition determination process (step S2011 in FIG. 20).

FIG. 22 is a schematic flowchart showing an example of the warp condition determination process (step S2011 in FIG. 20).

In step S2200, the server device 10 specifies the space portion (content provision position) in which the j-th friend avatar is located, based on the position/orientation information of the j-th friend avatar.

In step S2202, the server device 10 determines whether or not the user avatar M1 is located in the specific region based on the position/orientation information of the user avatar M1. In this embodiment, since the specific region is an arbitrary position, step S2202 may be automatically satisfied. However, in the case of a modified example, the specific region may be a region excluding part of the region in the virtual space (for example, the region within the predetermined distance D3 from the j-th friend avatar). If the determination result is "YES", the process proceeds to step S2204, and otherwise, the process proceeds to step S2218.

In step S2204, the server device 10 determines whether or not a ticket is required to move to the space portion (content provision position) where the j-th friend avatar is located, based on the data in the content information memory 144. If the determination result is "YES", the process proceeds to step S2206, and otherwise, the process proceeds to step S2208.

In step S2206, the server device 10 determines whether or not the user avatar M1 has a ticket for moving to the space portion (content provision position) where the j-th friend avatar is located. This determination method may be as described above in relation to the ticket possession determination portion 1661. If the determination result is "YES", the process proceeds to step S2208, and otherwise, the process proceeds to step S2210.

In step S2208, the server device 10 creates a state (movement allowed state) in which the user avatar M1 can move to the space portion (content provision position) where the j-th friend avatar is located. In this case, the predetermined warp condition is satisfied, and the determination result in step S2012 is "YES".

In step S2210, the server device 10 creates a state (movement prohibited state) in which the user avatar M1 cannot move to the space portion (content provision position) where the j-th friend avatar is located. In this case, the predetermined warp condition is not satisfied, and the determination result in step S2012 is "NO".

In step S2212, the server device 10 determines whether or not a plurality of tickets for moving to the space portion (content provision position) where the j-th friend avatar is located is associated with this j-th friend avatar, based on the data in the ticket information memory 145 (see FIG. 9). If the determination result is "YES", the process proceeds to step S2214, and otherwise, the process proceeds to step S2216.

In step S2214, the server device 10 outputs to the user related to the user avatar M1 auxiliary information (see the auxiliary information 1840-1 in FIG. 18) that prompts a request, for the transfer of a ticket, to the user related to the j-th friend avatar. As described above, the auxiliary information may be drawn in association with the warp button 1800 (see FIG. 18). The auxiliary information may include a button operated when sending a request to the user related to the j-th friend avatar. The output of this auxiliary information may be executed only when there is a high possibility that the destination of the user avatar M1 is likely to be next to the j-th friend avatar.

In step S2216, the server device 10 outputs to user related to the user avatar M1 auxiliary information (see the auxiliary information 1840-2 in FIG. 18) that communicates the sales position for a ticket for moving to the space portion (content provision position) where the j-th friend avatar is located. The auxiliary information may include a link or a button that is accessed or operated when instantaneously moving to the ticket sales position (ticket office).

In step S2218, the server device 10 creates a state (movement prohibited state) in which the user avatar M1 cannot move to the space portion (content provision position) where the j-th friend avatar is located. In this case, the predetermined warp condition is not satisfied, and the determination result in step S2012 is "NO".

In the process shown in FIG. 22, in step S2214, the server device 10 outputs to the user related to the user avatar M1 auxiliary information prompting a request, for the transfer of the ticket, to the user related to the j-th friend avatar, but in addition to this, the auxiliary information that is output in step S2216 may be output.

Figure 23:
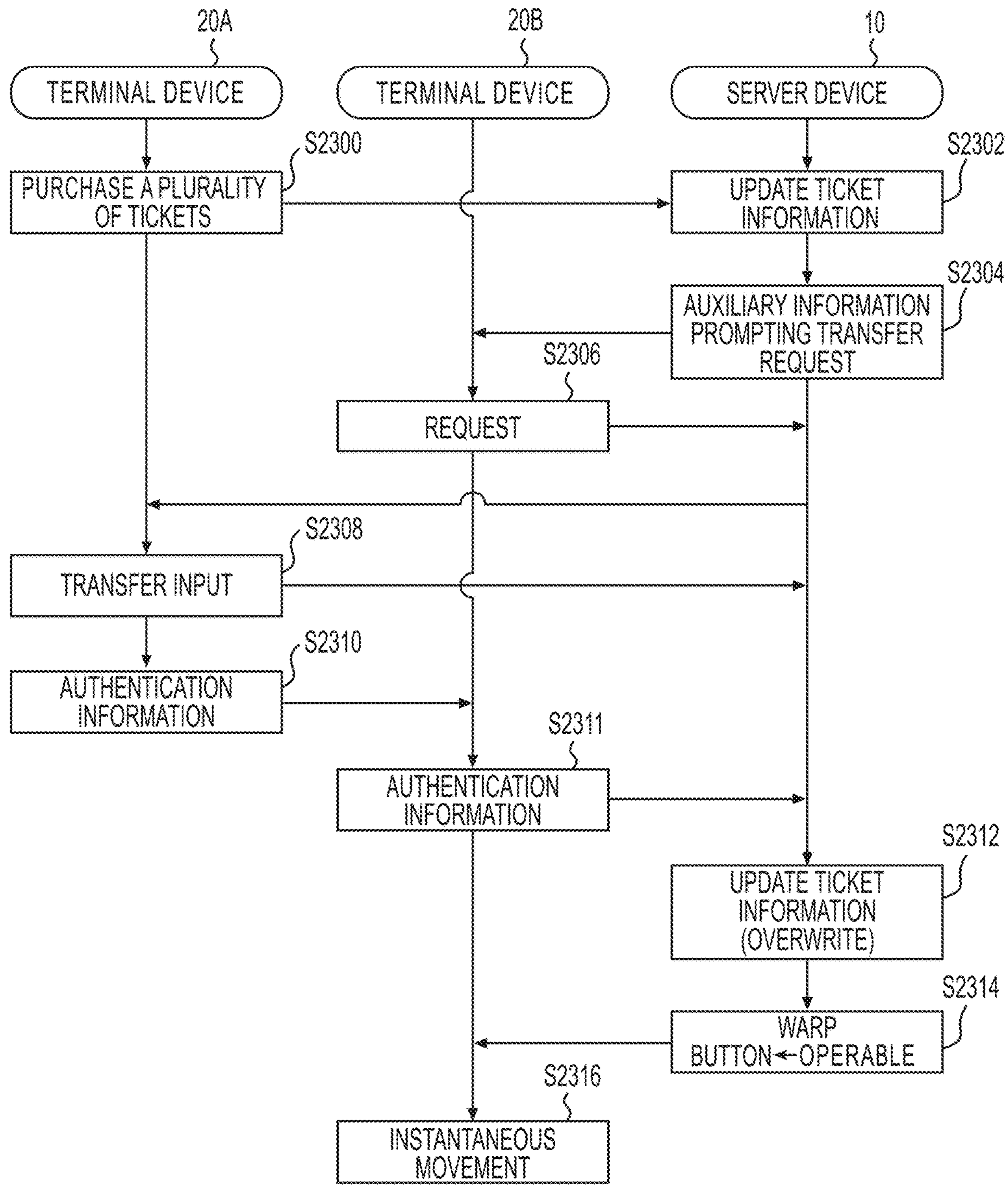
FIG. 23 is a schematic flowchart for when a request is transmitted to a user related to a friend avatar from a user related to a user avatar.

FIG. 23 is an explanatory view of FIG. 22, and is a schematic flowchart for when a request from the user related to the user avatar M1 to the user related to the j-th friend avatar is transmitted.

In FIG. 23, the terminal device 20A represents the terminal device 20 related to the user associated with the j-th friend avatar, and the terminal device 20B represents the terminal device 20 related to the user associated with the user avatar M1.

In this case, when the user associated with the j-th friend avatar purchases a plurality of tickets on the terminal device 20A (step S2300), the purchase information of those tickets is stored (updated) in the server device 10 (see the ticket information 900 in the ticket information memory 145 shown in FIG. 9) (step S2302).

After that, the server device 10 outputs to the terminal device 20B the auxiliary information prompting a request, for the transfer of a ticket, to the user related to the j-th friend avatar (see step S2214 in FIG. 22) (step S2304). Upon receiving this auxiliary information, a request is transmitted from the terminal device 20B to the terminal device 20A (step S2306). Note that this request may be transmitted from the terminal device 20B to the terminal device 20A via the server device 10.

The user associated with the j-th friend avatar sends a transfer input to the server device 10 in response to the request from the terminal device 20B (step S2308), and also communicates transfer authentication information to the user related to the terminal device 20B (step S2310). As described above, the transfer input may be transmitted in advance (for example, at the stage of step S2300) from the user associated with the j-th friend avatar. Similarly, as described above, the transfer authentication information may be communicated in advance from the user associated with the j-th friend avatar to the user of the terminal device 20B.

Upon receiving notification of the transfer authentication information from the user associated with the j-th friend avatar, the user of the terminal device 20B transmits the transfer authentication information to the server device 10 (step S2311). When transmitting the request to the terminal device 20A, the server device 10 may output the transfer authentication information input screen to the terminal device 20B.

Upon receiving the transfer authentication information from the terminal device 20B, the server device 10 performs comparison, and when the comparison is successful, the server device 10 associates one of the plurality of tickets associated with the user related to the j-th friend avatar with the user related to the terminal device 20B (step S2312). That is, such rewriting of the ticket information 900 may be as described above with reference to the ticket information rewriting portion 1644. Accompanying such rewriting, the server device 10 redraws the warp button 1800 related to the j-th friend avatar from the inoperable mode to the operable mode (step S2314).

As a result, the user of the terminal device 20B can instantaneously move the user avatar M1 to the side of the j-th friend avatar by operating the warp button 1800 related to the j-th friend avatar (step S2316).

Incidentally, in the embodiment described above with reference to FIG. 5 to FIG. 23, the server device 10 comprehensively realizes various functions, but some or all of the various functions of the above-mentioned server device 10 can be realized by the terminal device 20 instead of the server device 10. Below, a configuration in which some of the various functions of the server device 10 are realized by the terminal device 20 will be described as an example.

Figure 24:
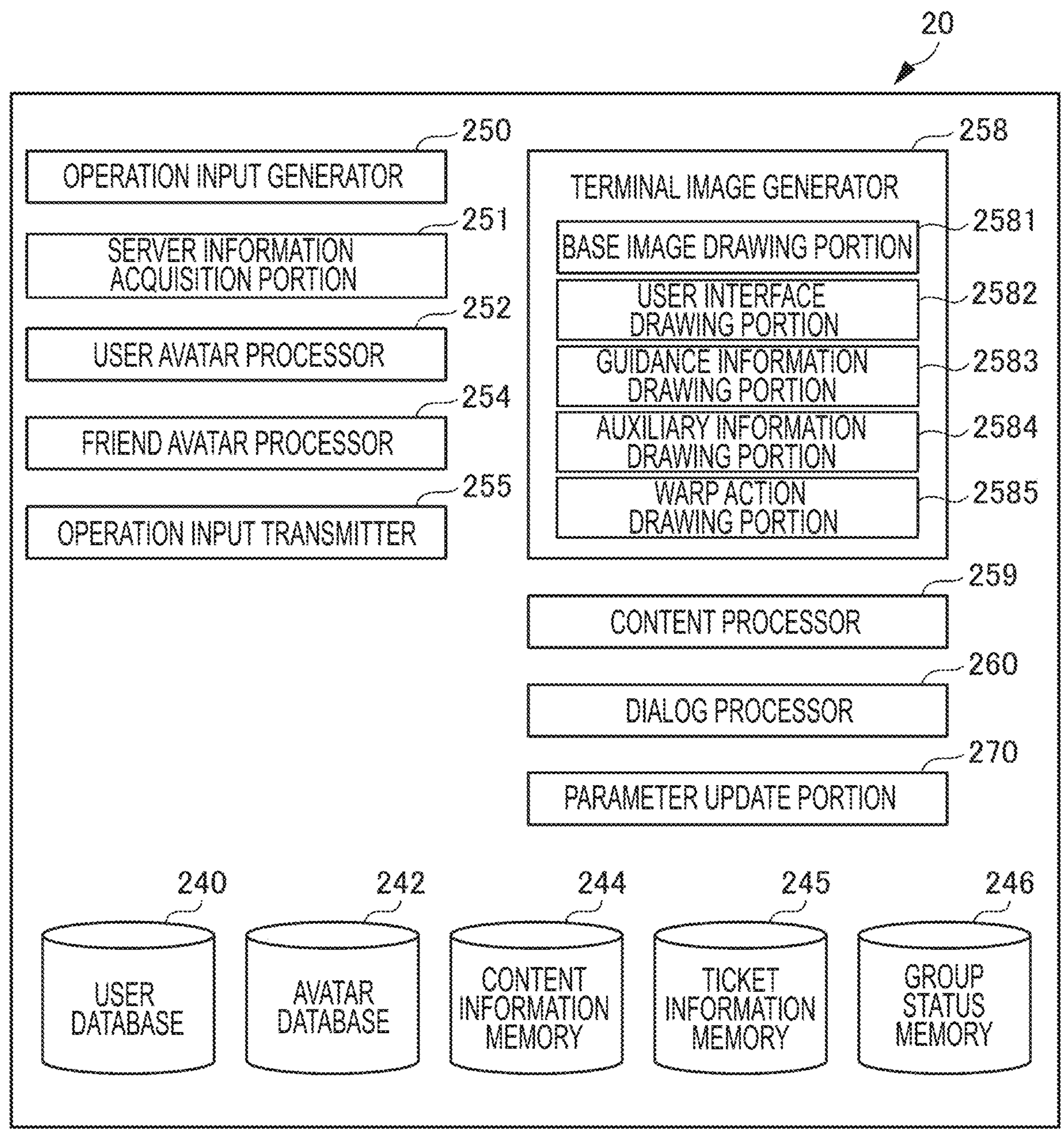
FIG. 24 is an example of a functional block diagram of a terminal device related to an avatar movement guidance function.

FIG. 24 is an example of a functional block diagram of the terminal device 20 related to the avatar movement guidance function. Below, one terminal device 20 will be described as representative, and user shall refer to a user related to the terminal device 20 unless otherwise specified.

In the example shown in FIG. 24, the terminal device 20 includes a user database 240, an avatar database 242, a content information memory 244, a ticket information memory 245, a group status memory 246, an operation input generator 250, a server information acquisition portion 251, a user avatar processor 252 (an example of acquisition portion and an example of a position change portion), a friend avatar processor 254, an operation input transmitter 255, a terminal image generator 258, a content processor 259, a dialog processor 260, and a parameter update portion 270.

The devices from the user database 240 to the group status memory 246 can be realized by the terminal memory 22 shown in FIG. 1, and the devices from the operation input generator 250 to the parameter update portion 270 can be realized by the terminal controller 25 shown in FIG. 1. Further, among the devices the operation input generator 250 to the parameter update portion 270, part of the devices (the functional portions that communicate with the server device 10) can be realized by the terminal communicator 21 together with the terminal controller 25 shown in FIG. 1.

The various items of data stored in each of the devices from the user database 240 to the group status memory 246 may be substantially the same as the various items of data stored in each the devices from the user database 140 to the group status memory 146 of the server device 10 described above. However, the various data stored in the user database 240 may be only data related to users and friend users thereof (users related to friend avatars in the same group; the same applies hereinafter) among the data stored in the user database 140 of the server device 10 described above. The same is also true of the ticket information memory 245 and the group status memory 246.

The operation input generator 250 generates the above-mentioned operation input information based on various inputs from the user (various inputs via the input portion 24). The various inputs from the user are as described above, and may include movement operation input, dialog input, ticket requests, transfer authentication information, and the like.

The server information acquisition portion 251 acquires from the server device 10 various data stored in each of the devices from the user database 240 to the group status memory 246. The data acquisition timing by the server information acquisition portion 251 is arbitrary, but may be at the time of updating the virtual reality application or the like. However, the acquisition (update) timing of the data stored in the group status memory 246 may be when the users constituting the group change. In this way, various data stored in each of the devices from the user database 240 to the group status memory 246 may be appropriately updated based on the data acquired by the server information acquisition portion 251.

The user avatar processor 252 has substantially the same function as the user avatar processor 152 of the server device 10 described above. However, the user avatar M1 to be processed by the user avatar processor 252 may be only the user avatar M1 associated with the user related to the terminal device 20.

The friend avatar processor 254 has substantially the same function as the user avatar processor 152 of the server device 10 described above. However, the user avatar M1 to be processed by the friend avatar processor 254 may be only a friend avatar for the user avatar M1 associated with the user related to the terminal device 20.

Similar to the user avatar processor 152 of the server device 10 described above, the user avatar processor 252 and the friend avatar processor 254 each realize various processing, such as movement processing that is based on a movement operation input, first warp processing, and second warp processing, with respect to the user avatar M1 to be processed. The user avatar processor 252 may perform various processes based on the operation input information related to the user, and the friend avatar processor 254 may perform various processes based on the operation input information related to the friend user. As a result, the position/orientation information of each user avatar M1 is updated.

The operation input transmitter 255 transmits the operation input information generated by the operation input generator 250 to the server device 10. In addition, instead of the operation input information, the operation input transmitter 255 may transmit to the server device 10 the position/orientation information of the user avatar M1 updated by the user avatar processor 252 based on the operation input information. Further, the operation input transmitter 255 may transmit the operation input information to the server device 10 only when another user avatar M1 (friend avatar) exists in the virtual space in which the user avatar M1 related to the user is active.

The terminal image generator 258 generates a terminal image for the terminal device 20. The terminal image may be as described above. In this case, for example, the terminal image generator 258 may draw each friend avatar based on position/orientation information of the friend avatar acquired or generated by the friend avatar processor 254, information that can identify the friend avatar to be drawn (for example, a user avatar ID), and the avatar information 700 relating to the friend avatar to be drawn (see FIG. 7). In this case, the terminal device 20 may store part information for drawing each part of the avatar in the terminal memory 22 (avatar database 242), and may draw each friend avatar based on this part information and the position/orientation information of the friend avatar acquired from the server device 10, and the like.

Specifically, the terminal image generator 258 includes a base image drawing portion 2581, a user interface drawing portion 2582, a guidance information drawing portion 2583, an auxiliary information drawing portion 2584, and a warp action drawing portion 2585. The devices from the base image drawing portion 2581 to the warp action drawing portion 2585 may each be the same as the respective ones of the devices from the base image drawing portion 1581 to the warp action drawing portion 1585 of the server device 10 described above. However, the terminal image to be drawn is only the terminal image for one terminal device 20.

The content processor 259 provides content to the user at each content provision position. The content to be provided to the user may be acquired from the server device 10 when the content provision condition is satisfied.

The dialog processor 260 has substantially the same function as the dialog processor 160 of the server device 10 described above. The dialog processor 260 executes dialog processing related to the dialog among users in the same group based on each dialog input from the user and friend users thereof.

The parameter update portion 270 updates each value of the various parameters (see FIG. 4) of the virtual camera 60 associated with the user avatar M1.

Figure 25:
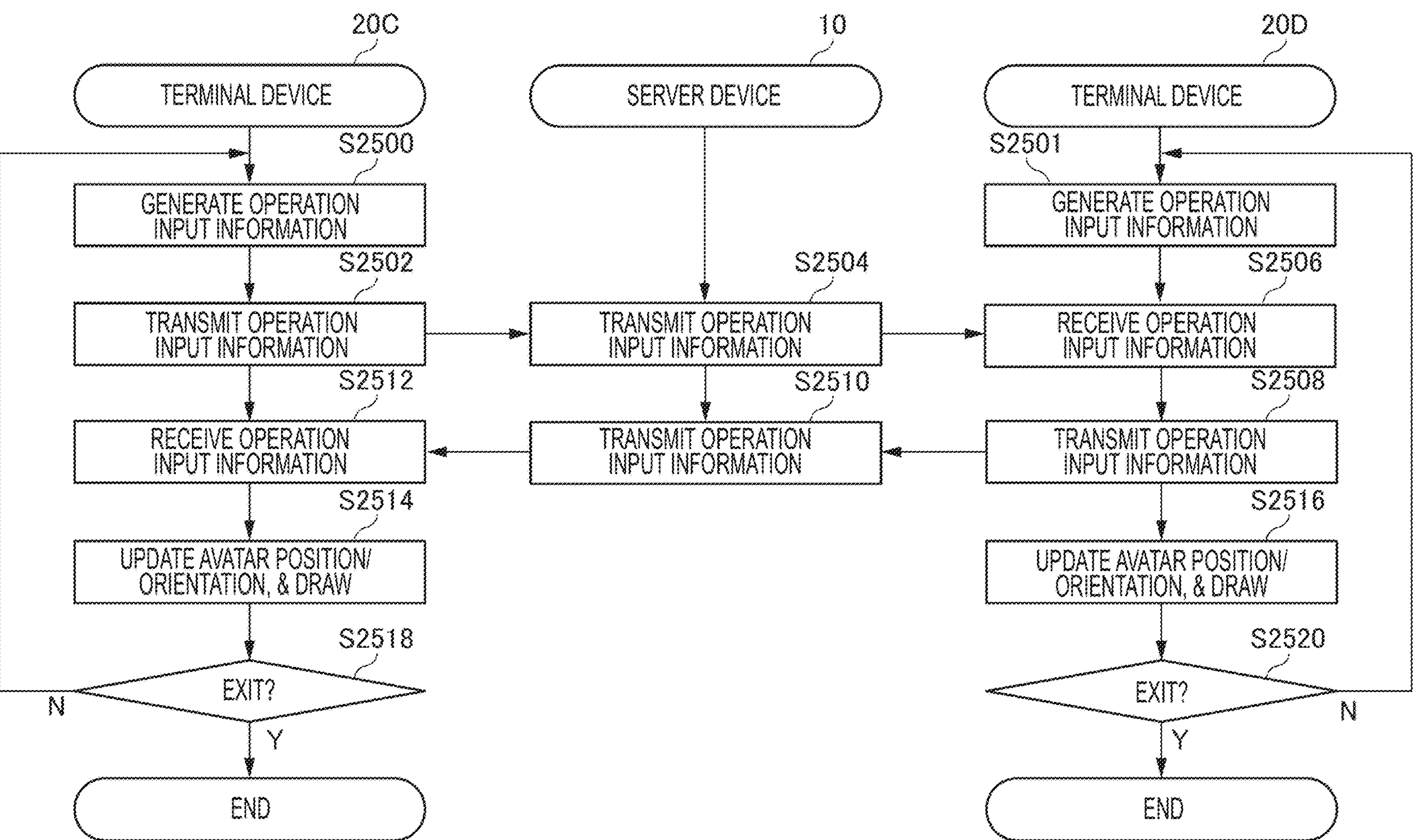
FIG. 25 is a schematic flowchart showing an example of an operation that is related to a terminal image generator, and is an example of an operation by the terminal device shown in FIG. 24.

FIG. 25 is an operation example by the terminal device 20 shown in FIG. 24, and is a schematic flowchart showing an example of an operation related to the terminal image generator 258. In FIG. 25, the terminal device 20C represents the terminal device 20 shown in FIG. 24 relating to the user, and the terminal device 20D represents the terminal device 20 shown in FIG. 24 relating to the user associated with one friend avatar in the same group. Here, there is one user related to the terminal device 20D, but the same applies even if there are two or more users. That is, in this case, the terminal device 20C and each of a plurality of terminal devices 20D may form a set to realize the operation example shown in FIG. 22.

In each of the terminal device 20C and the terminal device 20D, operation input information is generated based on various inputs by the corresponding users (step S2500, step S2501), and the generated operation input information is transmitted to the server device 10 (step S2502, step S2508). The server device 10 transfers the operation input information received from the terminal device 20 (here, the terminal device 20C and the terminal device 20D) of each user in the same group (step S2504, step S2510). At this time, the server device 10 may transfer the operation input information without change, or may transmit after performing predetermined processing or the like. For example, the operation input information may be transmitted after being converted into the position/orientation information of each user avatar M1. In this way, the operation input information (operation input information relating to the friend avatar) is received in each of the terminal device 20C and the terminal device 20D (step S2512, step S2506).

In the terminal device 20C, the position/orientation information of each user avatar M1 is updated and the terminal image is drawn based on the operation input information generated in step S2500 and the operation input information (operation input information related to the friend avatar) received in step S2512 (step S2514). At this time, the guidance information, auxiliary information, and the like as described above are also drawn. Similarly, in the terminal device 20D, the position/orientation information of each user avatar M1 is updated and the terminal image is drawn based on the operation input information generated in step S2501 and the operation input information (operation input information related to the friend avatar) received in step S2506 (step S2516). At this time, the guidance information, auxiliary information, and the like as described above are also drawn.

This kind of operation is repeated in each of the terminal device 20C and the terminal device 20D until the corresponding user avatar M1 exits the virtual space ("YES" in step S2518, "YES" in step S2520).

Although not shown in FIG. 25, in the above-mentioned dialog process (dialog process among user avatars M1 in the same group), voice input or the like generated in each of the terminal device 20C and the terminal device 20D may be realized by exchanges between the terminal device 20C and the terminal device 20D in the same manner as in the case of the above-mentioned operation input information.

Above, the embodiment has been described in detail with reference to the drawings, but the specific configuration is not limited to this embodiment, and designs and the like within a range not deviating from the summary are also included.

For example, in the above-described embodiment, the drawing of the guidance information may be realized by the appearance (drawing) of a leader avatar (not shown). In this case, the leader avatar can guide the guidance target user avatar M5 to the preceding user avatar M6 by moving to the preceding user avatar M6. That is, the user related to the guidance target user avatar M5 can easily move the guidance target user avatar M5 to the side of the preceding user avatar M6 by accomplishing movement operation input so that the guidance target user avatar M5 follows the leader avatar. In this case, the leader avatar may have an appearance or the like suggesting the preceding user avatar M6. Further, the leader avatar may have a mode of automatically moving the guidance target user avatar M5 to the side of the preceding user avatar M6 (a mode of pulling the hand of the guidance target user avatar M5). Such a mode may be realized in the second warp process.

Further, in the above-described embodiment, the second warp process is realized by the warp input by the user associated with the user avatar M1 that is instantaneously moved, but is not limited to this. That is, the second warp process may be realized by a warp input by a user other than the user associated with the user avatar M1 that is instantaneously moved. For example, in the case of a specific friend relationship such as a parent-child relationship, the user avatar M1 associated with the child user may be instantaneously moved to the side of the user avatar M1 associated with the parent user based on a specific warp input by the parent user. In this case, the user interface for the specific warp input may be realized by a button different from the warp button 1800, for example with a name such as a reverse warp button or a lost child button. In this case, for example, it is possible to realize user-friendly movement support for users who enjoy virtual reality as parent and child. Further, even when the child user cannot operate the warp button, the processing load related to drawing and the power consumption associated therewith (decrease in the charging state of the power supply) can be reduced in the terminal device 20 related to the child user.

Further, in the above-described embodiment, the second warp process may be realized by the appearance of a warp region such as the warp region 1100 in the vicinity of the guidance target user avatar M5. In this case, the exit side of the warp region 1100 may be set in the vicinity of the preceding user avatar M6. In this case, the user related to the guidance target user avatar M5 can instantaneously move the guidance target user avatar M5 to the vicinity of the preceding user avatar M6 by just simply performing a relatively simple movement operation input to move the guidance target user avatar M5 to the nearby warp region.

Further, in the above-described embodiment, the function of the guidance information drawing portion 1583 (the same applies to the guidance information drawing portion 2583) may be turned on or off by selection by the user.

Further, in the above-described embodiment, regarding the second warp process of instantaneously moving the user avatar M1 to the side of one friend avatar located in the space portion where a ticket is required, the second predetermined position may change in accordance with the ticket possession status of the user avatar M1. For example, when the user avatar M1 has a ticket for moving into that space portion, the second predetermined position may be set in that space portion. On the other hand, when the user avatar M1 does not have a ticket for moving into that space portion, the second predetermined position may be outside that space portion (for example, at an entrance). Such a configuration is suitable when there is a ticket office that sells tickets for moving to that space portion outside the space (for example, at the entrance).

As used throughout this disclosure, the singular forms "a," "an," and "the" may refer to either singular or plural elements unless the context clearly dictates otherwise.

DESCRIPTION OF REFERENCE SYMBOLS

1 Virtual reality generation system
2 Network
10 Server device
20 Terminal device
60 Virtual camera
70 Free space portion
140 User database
142 Avatar database
144 Content information memory
145 Ticket information memory
146 Group status memory
150 Group setting portion
152 User avatar processor
1521 Operation input acquisition portion
1522 User operation processor
15221 Basic operation processor
15222 First warp processor
15223 Second warp processor
158 Terminal image generator
1581 Base image drawing portion
1582 User interface drawing portion
1583 Guidance information drawing portion
15831 Distance calculator
15832 Distance change determination portion
1584 Auxiliary information drawing portion
1585 Warp action drawing portion
1586 Space portion transition drawing portion
159 Content processor
160 Dialog processor
162 First movement authority processor
1621 Purchase input acquisition portion
1622 Ticket ID generator
1623 Authentication information notification portion
1624 Ticket drawing portion
164 Second movement authority processor
1640 Transfer input acquisition portion
1641 Authentication notification guidance portion
1644 Ticket information rewriting portion
166 Determination processor
1661 Ticket possession determination portion
1662 Invalidation processor
170 Parameter update portion
240 User database
242 Avatar database
244 Content information memory
245 Ticket information memory
246 Group status memory
250 Operation input generator
251 Server information acquisition portion
252 User avatar processor
254 Friend avatar processor
255 Operation input transmitter
258 Terminal image generator
2581 Base image drawing portion
2582 User interface drawing portion
2583 Guidance information drawing portion
2584 Auxiliary information drawing portion
2585 Warp action drawing portion
259 Content processor
260 Dialog processor
270 Parameter update portion
300 User interface
309 Dialog interface
350 Avatar icon
351 Avatar icon
352 Avatar icon
360 Microphone icon
1800 (1800-1, 1800-2) Warp button

The invention claimed is:

1. An information processing system including:
one or more processors programmed to
draw a display image for a terminal including at least a first display medium, associated with a first user, positioned in a virtual space;
acquire user input; and
change a position of the first display medium in the virtual space based on a first input from the first user, wherein
when it is determined that the first display medium is positioned within a specific region in the virtual space, the one or more processors cause the first display medium to move from the specific region to a second predetermined position, in a shorter time than a time required for movement based on the first input, in accordance with a second input from the first user associated with the first display medium, and
the second predetermined position is set within a predetermined distance with respect to a position of a second display medium associated with a second user.

2. The information processing system according to claim 1, wherein
the specific region includes a current position of the first display medium.

3. The information processing system according to claim 1, wherein
the one or more processors draw, in an operable state, a first operation portion for inputting the second input when the first display medium is positioned within the specific region.

4. The information processing system according to claim 3, wherein
the one or more processors draw the first operation portion in an inoperable state when the first display medium is not positioned within the specific region.

5. The information processing system according to claim 3, wherein
the one or more processors separately draw the first operation portion associated with each of second display media when a plurality of second display media associated with a plurality of second users is positioned in the virtual space, and
the one or more processors cause the first display medium to move to the second predetermined position in accordance with the position of one of the second display media, in accordance with the second input to the first operation portion associated with the one of the second display media.

6. The information processing system according to claim 1, further comprising a memory that stores authority information relating to movement authority necessary for the first display medium to enter a specific space portion in the virtual space, wherein the one or more processors determine whether or not movement of the first display medium to the specific space portion is possible on the basis of the authority information stored in the memory, and the one or more processors invalidate the second input for moving to the specific space portion when it is determined that the movement of the first display medium to the specific space portion is impossible.

7. The information processing system according to claim 6, wherein the one or more processors determine that the movement of the first display medium to the specific space portion is possible when (i) information that a plurality of the movement authorities was acquired is associated with the second display medium associated with the second user and (ii) the first display medium satisfies a predetermined condition.

8. The information processing system according to claim 6, wherein when the second input is invalidated, the one or more processors draw auxiliary information for removing the invalidation.

9. The information processing system according to claim 8, wherein the auxiliary information includes at least one of information about an acquisition method of the movement authority, information about a position in the virtual space where acquisition of the movement authority is possible, information about a link or access method to a specified screen where the acquisition of the movement authority is possible, benefit information when the movement authority is acquired, and information relating to content that is viewable when the movement authority is acquired.

10. A non-transitory computer-readable medium storing an information processing program that causes a computer to execute a process that:

draws a display image for a terminal including at least a first display medium, associated with a first user, positioned in a virtual space;

acquires user input; and causes a position of the first display medium in the virtual space to change based on a first input from the first user, wherein when it is determined that the first display medium is positioned within a specific region in the virtual space, the first display medium is caused to move from the specific region to a second predetermined position, in a shorter time than a time required for movement based on the first input, in accordance with a second input from the first user associated with the first display medium, and the second predetermined position is set within a predetermined distance with respect to a position of a second display medium associated with a second user.

11. An information processing method executed by a computer, the method comprising:

drawing a display image for a terminal including at least a first display medium, associated with a first user, positioned in a virtual space;

acquiring user input; and causing a position of the first display medium in the virtual space to change based on a first input from the first user, wherein when it is determined that the first display medium is positioned within a specific region in the virtual space, the first display medium is caused to move from the specific region to a second predetermined position, in a shorter time than a time required for movement based on the first input, in accordance with a second input from the first user associated with the first display medium, and the second predetermined position is set within a predetermined distance with respect to a position of a second display medium associated with a second user.

* * * * *